US012392111B2

(12) United States Patent
Akita et al.

(10) Patent No.: US 12,392,111 B2
(45) Date of Patent: Aug. 19, 2025

(54) WORK MACHINE

(71) Applicant: HITACHI CONSTRUCTION MACHINERY CO., LTD., Tokyo (JP)

(72) Inventors: Taro Akita, Tsuchiura (JP); Shota Ishida, Tsukuba (JP); Mitsuhiko Kanehama, Kasumigaura (JP); Ryohei Fukuchi, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/850,738

(22) PCT Filed: Mar. 10, 2023

(86) PCT No.: PCT/JP2023/009308
§ 371 (c)(1),
(2) Date: Sep. 25, 2024

(87) PCT Pub. No.: WO2023/189421
PCT Pub. Date: Oct. 5, 2023

(65) Prior Publication Data

US 2025/0223782 A1 Jul. 10, 2025

(30) Foreign Application Priority Data

Mar. 31, 2022 (JP) ................................ 2022-058663

(51) Int. Cl.
*E02F 9/22* (2006.01)
*E02F 9/20* (2006.01)
(Continued)

(52) U.S. Cl.
CPC .......... *E02F 9/2203* (2013.01); *E02F 9/2004* (2013.01); *F15B 11/042* (2013.01);
(Continued)

(58) Field of Classification Search
CPC ..... E02F 9/2285; E02F 9/2203; E02F 9/2004; F15B 11/042
See application file for complete search history.

(56) References Cited

U.S. PATENT DOCUMENTS

| | | | | |
|---|---|---|---|---|
| 7,866,149 | B2 * | 1/2011 | Brinkman | F15B 21/082 60/378 |
| 10,246,855 | B2 * | 4/2019 | Greer | E02F 3/3414 |

FOREIGN PATENT DOCUMENTS

| | | | | |
|---|---|---|---|---|
| EP | 3225751 | A1 * | 10/2017 | E02F 3/32 |
| JP | H06146325 | A * | 11/1992 | |

(Continued)

OTHER PUBLICATIONS

International Search Report of PCT/JP2023/009308 dated Apr. 4, 2023.

*Primary Examiner* — Abiy Teka
(74) *Attorney, Agent, or Firm* — MATTINGLY & MALUR, PC

(57) ABSTRACT

Provided is a work machine capable of appropriately switching between prevention of the degradation in a ride quality caused by an inertial force generated in braking of a hydraulic actuator and a work using the inertial force. In the work machine, under a condition where an operation device has been operated from an operation position toward a neutral position, in a case where an actual operation speed of the operation device is less than a quick operation threshold (S21: Yes), a spool is made moved from a supply and discharge position toward a blocking position at a first speed that is slower than a reference speed corresponding to the operation speed (S25, S27 to S29), and at a second speed that is faster than the first speed (S26 to S29) in a case where the operation speed is equal to or more than the quick operation threshold (S21: No).

4 Claims, 15 Drawing Sheets

(51) Int. Cl.
*F15B 11/042* (2006.01)
*F15B 11/044* (2006.01)
*F15B 11/08* (2006.01)

(52) U.S. Cl.
CPC ............ *F15B 11/044* (2013.01); *F15B 11/08* (2013.01); *E02F 9/2285* (2013.01); *E02F 9/2292* (2013.01)

(56) References Cited

FOREIGN PATENT DOCUMENTS

| | | | |
|---|---|---|---|
| JP | 06-146325 | A | 5/1994 |
| JP | 2010-203109 | A | 9/2010 |
| JP | 2017-179929 | A | 10/2017 |
| WO | 2014/013877 | A1 | 1/2014 |
| WO | 2015/102059 | A1 | 7/2015 |

* cited by examiner

WORK MACHINE

TECHNICAL FIELD

The present invention relates to a work machine equipped with a hydraulic actuator.

BACKGROUND ART

In a conventional work machine, various hydraulic actuators such as a traveling motor for making a vehicle body travel, a swing motor for making an upperstructure swing, hydraulic cylinders for raising and lowering a front working device, and the like are mounted.

In such a work machine, an operation of braking of a hydraulic actuator causes the vehicle body to vibrate due to an inertial force, which degrades a ride quality. For this problem, Patent Literature 1 discloses a technique of reducing an inertial force generated in braking of a hydraulic actuator to prevent degradation in a ride quality.

CITATION LIST

Patent Literature

Patent Literature 1: WO2014/013877

SUMMARY OF INVENTION

Technical Problem

On the other hand, the works that a work machine performs include such a work that uses a large inertial force generated in braking of a hydraulic actuator while forcing an operator to tolerate the degradation in a ride quality, such as a work of dropping mud in the bucket. However, in the technique of Patent Literature 1, the work of dropping mud in the bucket as described above cannot be performed due to a reduced inertial force.

The present invention has been made in view of the circumstances described above, and an object thereof is to provide a work machine capable of appropriately switching between prevention of the degradation in a ride quality caused by an inertial force generated in braking of a hydraulic actuator and a work using the inertial force.

Solution to Problem

In order to achieve the object described above, the present invention provides a work machine comprising: a prime mover; a hydraulic pump configured to pump a hydraulic oil upon being driven by the prime mover; a hydraulic actuator configured to operate upon being supplied with or discharging the hydraulic oil; a supply flow path for supplying the hydraulic oil pumped by the hydraulic pump to the hydraulic actuator; a return flow path for bringing the hydraulic oil discharged from the hydraulic actuator to a hydraulic oil tank; a directional control valve having a spool that moves between a supply and discharge position and a blocking position, the supply and discharge position being a position for opening the supply flow path and the return flow path to cause the hydraulic oil to be supplied to and discharged from the hydraulic actuator, and the blocking position being a position for blocking the supply flow path and the return flow path to stop the hydraulic oil to be supplied to and discharged from the hydraulic actuator; an operation device configured to be operated between an operation position corresponding to the supply and discharge position of the spool and a neutral position corresponding to the blocking position of the spool; and a controller configured to bring the spool closer to the supply and discharge position as the operation device approaches the operation position to increase a volume of the hydraulic oil to be supplied to and discharged from the hydraulic actuator, and bring the spool closer to the blocking position as the operation device approaches the neutral position to reduce the volume of the hydraulic oil to be supplied to and discharged from the hydraulic actuator, wherein in a case where the operation device has been operated from the operation position toward the neutral position, the controller is configured to: move the spool from the supply and discharge position toward the blocking position at a first speed that is slower than a reference speed in a case where an operation speed of the operation device is less than a quick operation threshold; and move the spool from the supply and discharge position toward the blocking position at a second speed that is faster than the first speed in a case where the operation speed is equal to or more than the quick operation threshold.

Advantageous Effects of Invention

According to the present invention, it is possible to obtain a work machine capable of appropriately switching between prevention of the degradation in a ride quality caused by an inertial force generated when a hydraulic actuator is braked and a work using the inertial force. The problems, arrangements, and advantageous effects other than those described above will be clarified by explanation of the embodiments below.

DESCRIPTION OF EMBODIMENTS

An embodiment of a hydraulic excavator 1 (work machine) according to the present invention will be described with reference to the drawings. It should be noted that a specific example of the work machine is not limited to the hydraulic excavator 1, but may be a wheel loader, a crane, a dump truck, or the like. It should be also noted that, the front, rear, left, and right are mentioned herein based on the viewpoint of an operator who rides on to operate the hydraulic excavator 1 unless otherwise specified.

Figure 1:
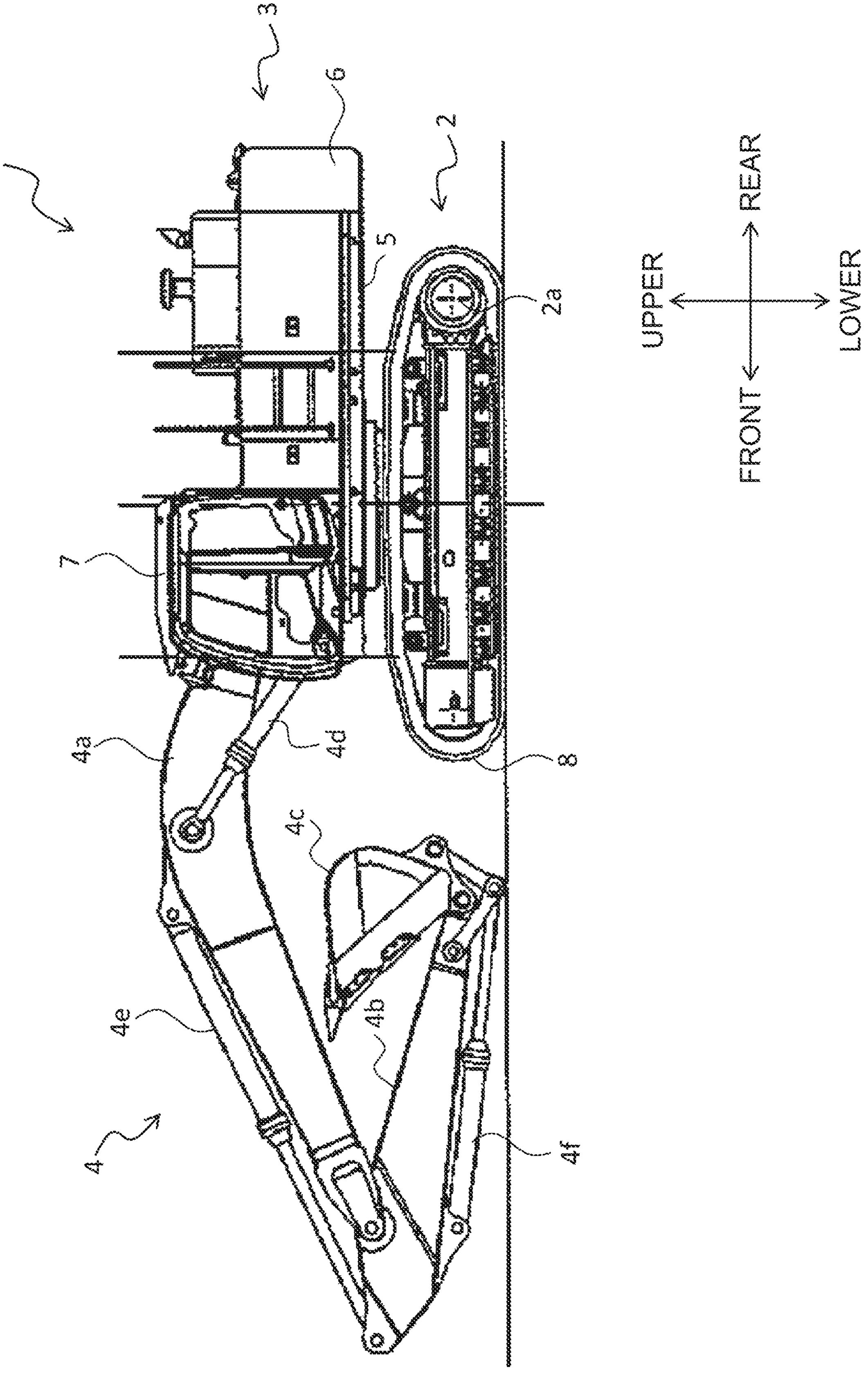
FIG. 1 is a side view of a hydraulic excavator.

FIG. 1 is a side view of the hydraulic excavator 1. As illustrated in FIG. 1, the hydraulic excavator 1 includes an undercarriage 2 and an upperstructure 3 supported by the undercarriage 2. The undercarriage 2 and the upperstructure 3 are examples of a machine body. The undercarriage 2 includes a pair of left and right crawlers 8 that are continuous tracks. Driving a traveling motor 2*a* causes the pair of right and left crawlers 8 to rotate independently. This makes the hydraulic excavator 1 travel. However, the undercarriage 2 may include wheels instead of the crawlers 8.

Figure 2:
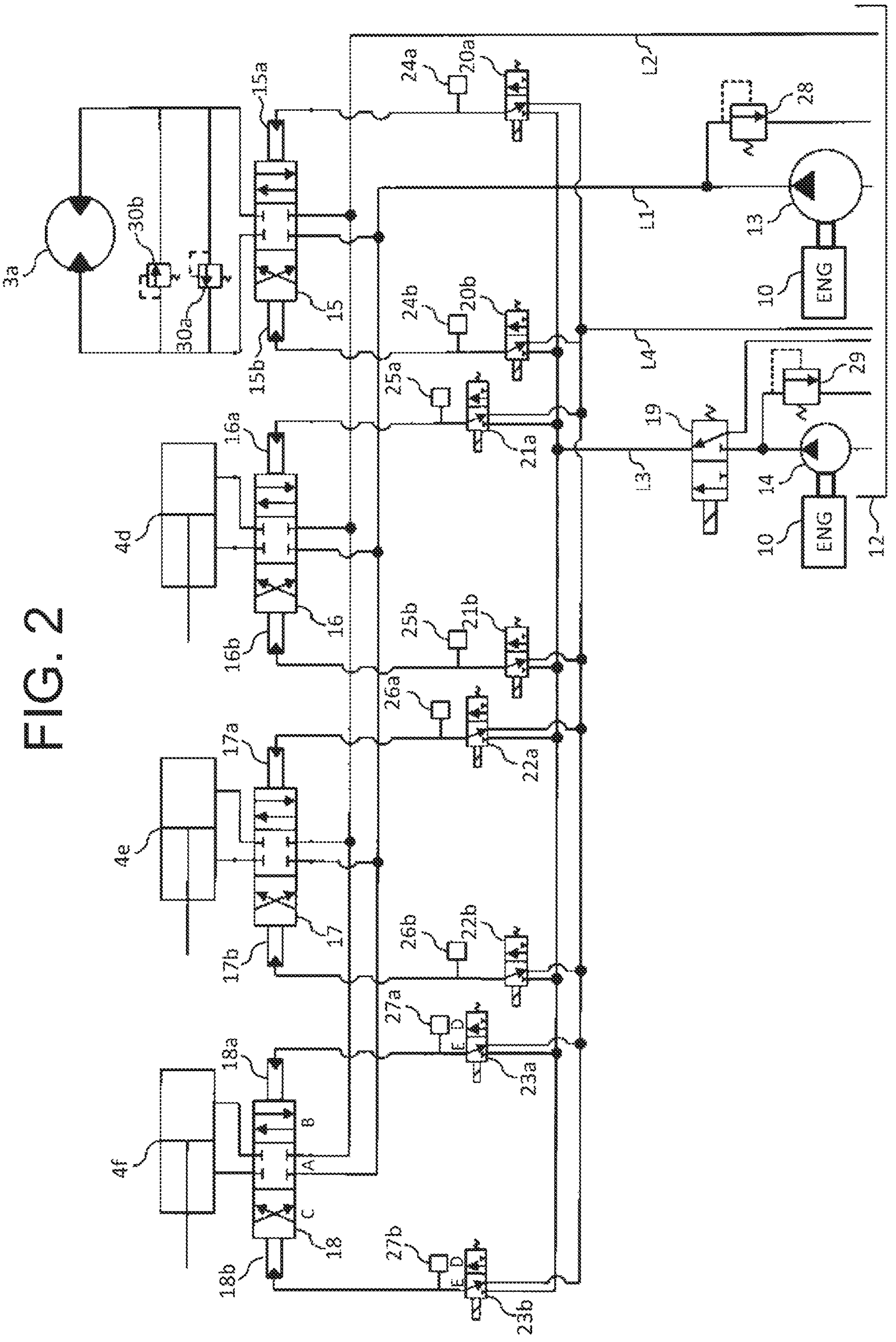
FIG. 2 illustrates a drive circuit of a hydraulic excavator according to the present embodiment.

The upperstructure 3 is supported on the undercarriage 2 so as to be made swung by a swing motor 3*a* (see FIG. 2). The upperstructure 3 mainly includes a swing frame 5 serving as a base, a front working device 4 (working device) mounted to the center of the front of the swing frame 5 so as to be rotatable in the vertical direction, a cab (operator's seat) 7 placed on the left side of the front of the swing frame 5, and a counterweight 6 placed on the rear of the swing frame 5.

The front working device 4 includes a boom 4*a* supported on the upperstructure 3 so as to raise and lay down, an arm 4*b* supported on the distal end of the boom 4*a* so as to be rotatable, a bucket 4*c* supported on the distal end of the arm 4*b* so as to be rotatable, boom cylinders 4*d* for driving the boom 4*a*, an arm cylinder 4*e* for driving the arm 4*b*, and a bucket cylinder 4*f* for driving the bucket 4*c*. The counterweight 6 is a heavy object having an arc shape as viewed from the above, which is provided to adjust the weight balance with the front working device 4.

Each of the traveling motor 2*a*, the swing motor 3*a*, the boom cylinders 4*d*, the arm cylinder 4*e*, and the bucket cylinder 4*f* is an example of a hydraulic actuator that operates upon being supplied with and discharging hydraulic oil. However, specific examples of the hydraulic actuators are not limited thereto. Hereinafter, these actuators may be collectively referred to as "hydraulic actuators 2*a*, 3*a*, 4*d* to 4*f*" and the like.

The cab 7 has an internal space allowing an operator who operates the hydraulic excavator 1 to ride therein. In the internal space of the cab 7, a seat on which the operator sits and an operation device to be operated by an operator who has sit on the seat are placed.

Figure 3:
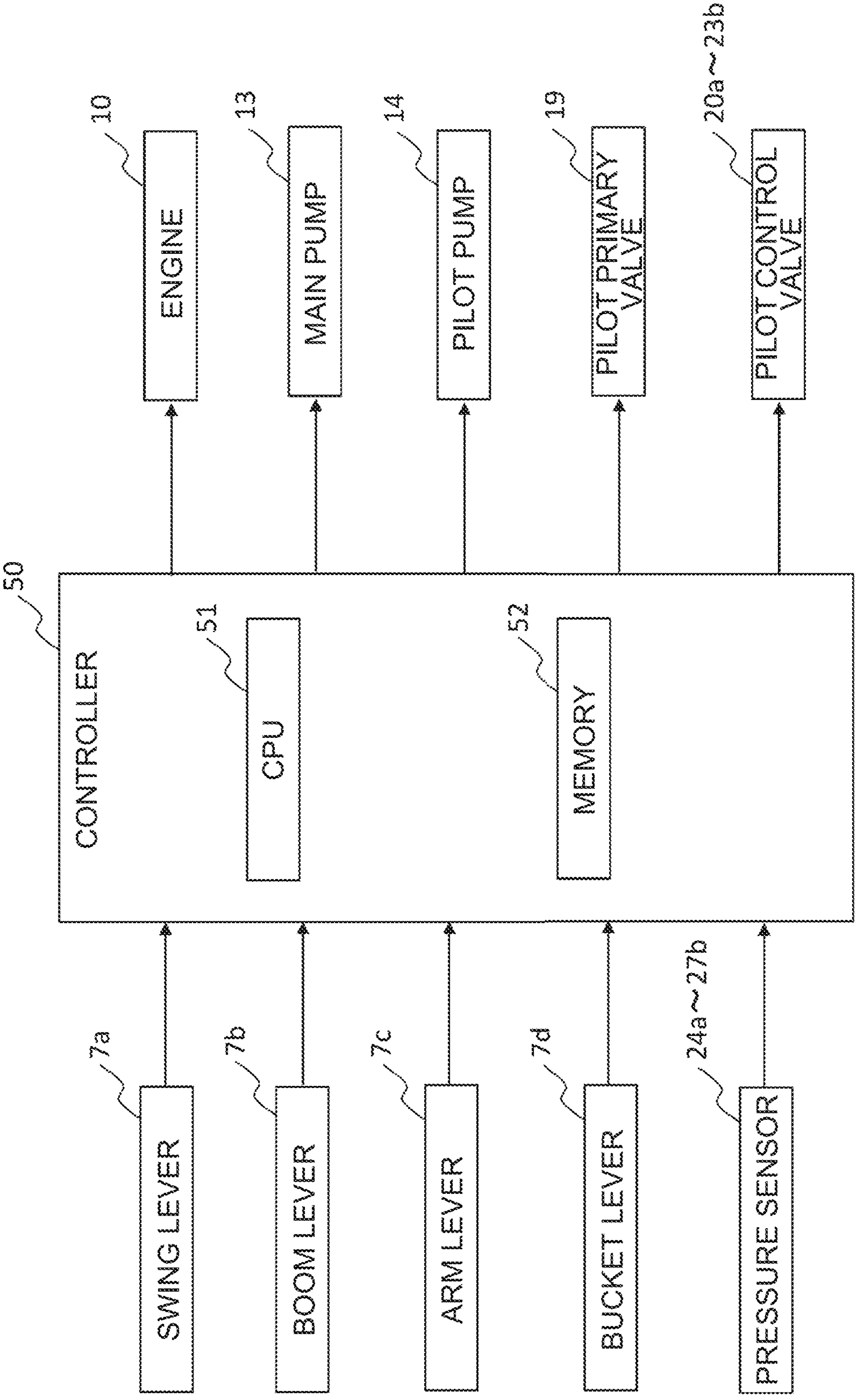
FIG. 3 is a control block diagram of a hydraulic excavator according to the present embodiment.

The operation device accepts an operation for operating the hydraulic excavator 1 from an operator. An operation which has been made to the operation device by the operator causes the undercarriage 2 to travel, the upperstructure 3 to swing, and the front working device 4 to work. Specific examples of the operation device include a lever, a steering wheel, an accelerator pedal, a brake pedal, a switch, and the like. As illustrated in FIG. 3, the operation device includes a traveling pedal (not illustrated), a swing lever 7*a*, a boom lever 7*b*, an arm lever 7*c*, and a bucket lever 7*d*.

The traveling pedal accepts an operation for instructing to cause the traveling motor 2*a* to rotate from the operator. The swing lever 7*a* accepts an operation for instructing to cause the swing motor 3*a* to rotate from the operator. The boom lever 7*b* accepts an operation for instructing to cause the boom cylinders 4*d* to expand and contract from the operator. The arm lever 7*c* accepts an operation for instructing to cause the arm cylinder 4*e* to expand and contract from the operator. The bucket lever 7*d* accepts an operation for instructing to cause the bucket cylinder 4*f* to extend and contract from the operator. The levers 7*a* to 7*d* do not have to be provided independently, but first and second levers may be provided and set such that the front and rear direction of the first lever corresponds to the swing lever 7*a*, the left and right direction of the first lever corresponds to the boom lever 7*b*, the front and rear direction of the second lever corresponds to the arm lever 7*c*, and the left and right direction of the second lever corresponds to the bucket lever 7*d*.

FIG. 2 illustrates a drive circuit of the hydraulic excavator 1 according to the present embodiment. As illustrated in FIG. 2, the hydraulic excavator 1 mainly includes an engine 10, a hydraulic oil tank 12, a main pump 13 (hydraulic pump), a pilot pump 14, directional control valves 15, 16, 17, 18, a pilot primary valve 19, pilot control valves 20*a*, 20*b*, 21*a*, 21*b*, 22*a*, 22*b*, 23*a*, 23*b*, and pressure sensors 24*a*, 24*b*, 25*a*, 25*b*, 26*a*, 26*b*, 27*a*, 27*b*.

The engine 10 is a prime mover that generates power for driving the hydraulic excavator 1. The hydraulic oil tank 12 stores the hydraulic oil therein. The main pump 13 is rotated by the power of the engine 10, and pumps the hydraulic oil stored in the hydraulic oil tank 12 to a hydraulic oil supply flow path L1. The pilot pump 14 is rotated by the power of the engine 10 also serving as the power source of the main pump 13, and pumps the hydraulic oil stored in the hydraulic oil tank 12 to a pilot supply flow path L3 as pilot pressure oil.

The hydraulic oil supply flow path L1 is a flow path for the hydraulic oil, which extends from the hydraulic oil tank 12 to the hydraulic actuators 3*a*, 4*d* to 4*f* via the main pump 13 and the directional control valves 15 to 18 (in FIG. 3, the driving motor 2*a* is not illustrated). That is, the hydraulic oil supply flow path L1 is a supply flow path for supplying the hydraulic oil pumped by the main pump 13 to the hydraulic actuators 3*a*, 4*d* to 4*f*.

The hydraulic actuators 3*a*, 4*d* to 4*f* are connected to the hydraulic oil tank 12 through a hydraulic oil return flow path L2. The hydraulic oil return flow path L2 is a flow path extending from the hydraulic actuators 3*a*, 4*d* to 4*f* to the hydraulic oil tank 12 via the directional control valves 15 to 18. That is, the hydraulic oil return flow path L2 is a return flow path for bringing the hydraulic oil discharged from the hydraulic actuators 3*a*, 4*d* to 4*f* back to the hydraulic oil tank 12.

A pilot supply flow path L3 is a flow path for the pilot pressure oil, which extends from the hydraulic oil tank 12 to pilot ports 15*a* to 18*b* of the directional control valves 15 to 18 via the pilot pump 14, the pilot primary valve 19, and the pilot control valves 20*a* to 23*b*. That is, the pilot supply flow path L3 is a flow path for supplying the pilot pressure oil pumped by the pilot pump 14 to the pilot ports 15*a* to 18*b*.

The pilot ports 15*a* to 18*b* are connected to the hydraulic oil tank 12 through a pilot return flow path L4. The pilot return flow path L4 is a flow path extending from the pilot ports 15*a* to 18*b* to the hydraulic oil tank 12 via the pilot control valves 20*a* to 23*b*. That is, the pilot return flow path L4 is a flow path for bringing the pilot pressure oil discharged from the pilot ports 15*a* to 18*b* back to the hydraulic oil tank 12.

The directional control valves 15 to 18 are placed on the hydraulic oil supply flow path L1 and the hydraulic oil return flow path L2. The directional control valves 15 to 18 control the volume and direction of the hydraulic oil supplied to the hydraulic actuators 3*a*, 4*d* to 4*f* through the hydraulic oil supply flow path L1 and the volume of the hydraulic oil discharged from the hydraulic actuators 3*a*, 4*d* to 4*f* through the hydraulic oil return flow path L2.

More specifically, the directional control valve 15 controls the supply and discharge of the hydraulic oil to and from the swing motor 3*a*, the directional control valve 16 controls the supply and discharge of the hydraulic oil to and from the boom cylinders 4*d*, the directional control valve 17 controls the supply and discharge of the hydraulic oil to and from the arm cylinder 4*e*, and the directional control valve 18 controls the supply and discharge of the hydraulic oil to and from the bucket cylinder 4*f*. The directional control valves 15 to 18 have the structures which are common to each other, and thus, in the following, the directional control valve 18 will be described in detail.

The directional control valve 18 includes a spool that moves between a blocking position A, a dump position B, and a cloud position C. The blocking position A is a position for blocking the hydraulic oil supply flow path L1 and the hydraulic oil return flow path L2 to stop the supply and discharge of the hydraulic oil to and from the bucket cylinder 4*f*. The dump position B and the cloud position C are positions for opening the hydraulic oil supply flow path L1 and the hydraulic oil return flow path L2 to allow the hydraulic oil to be supplied to and discharged from the bucket cylinder 4*f*. The dump position B and the cloud position C are located opposite to each other across the blocking position A.

More specifically, the dump position B is a position for causing the hydraulic oil to be supplied to a rod chamber of the bucket cylinder 4*f* and to be discharged from a bottom chamber so as to make the bucket cylinder 4*f* contract. The cloud position C is a position for causing the hydraulic oil to be supplied to the bottom chamber of the bucket cylinder 4*f* and to be discharged from the rod chamber so as to make the bucket cylinder 4*f* extend. As the spool approaches the blocking position A, the volume of hydraulic oil supplied to and discharged from the bucket cylinder 4*f* decreases. On the other hand, as the spool approaches the dump position B or the cloud position C, the volume of hydraulic oil supplied to and discharged from the bucket cylinder 4*f* increases.

The spool of the directional control valve 18 is initially at the blocking position A. In the directional control valve 18, the pilot pressure oil is supplied to the pilot port 18*a* and discharged from the pilot port 18*b*, whereby the spool moves from the blocking position A toward the dump position B. Furthermore, in the directional control valve 18, the pilot pressure oil is supplied to the pilot port 18*b* and discharged from the pilot port 18*a*, whereby the spool moves from the blocking position A toward the cloud position C.

The pilot primary valve 19 is placed on the pilot supply flow path L3 at a position closer to the pilot pump 14 than the pilot control valves 20*a* to 23*b*. The pilot primary valve 19 controls the volume of pilot pressure oil supplied from the pilot pump 14 to the pilot control valves 20*a* to 23*b*. The pilot primary valve 19 is a directional solenoid valve that controls the volume of supply in accordance with the control by the controller 50.

The pilot control valves 20*a* to 23*b* are placed on the pilot supply flow path L3 and the pilot return flow path L4 at positions closer to the pilot ports 15*a* to 18*b* than the pilot primary valve 19. The pilot control valves 20*a* to 23*b* control the volume of hydraulic oil supplied to the pilot ports 15*a* to 18*b* through the pilot supply flow path L3 and the volume of hydraulic oil discharged from the pilot ports 15*a* to 18*b* through the pilot return flow path L4. The pilot control valves 20*a* to 23*b* are directional solenoid valves that control the volume of supply in accordance with the control by the controller 50. The pilot control valves 20*a* to 23*b* have the structures which are common to each other, and thus, in the following, the pilot control valves 23*a*, 23*b* will be described in detail.

The pilot control valve 23*a* is placed between the pilot port 18*a* and the pilot pump 14, and, between the pilot port 18*a* and the hydraulic oil tank 12. The pilot control valve 23*a* includes a spool that moves between a supply position D and a return flow position E. The supply position D is a position for supplying the pilot pressure oil pumped from the pilot pump 14 to the pilot port 18*a*. The return flow position E is a position for bringing the pilot pressure oil discharged from the pilot port 18*a* back to the hydraulic oil tank 12. The spool of the pilot control valve 23*a* is initially at the return flow position E. The spool approaches the supply position D from the return flow position E as a command current output from the controller 50 increases.

The pilot control valve 23*b* is placed between the pilot port 18*b* and the pilot pump 14, and, between the pilot port 18*b* and the hydraulic oil tank 12. The pilot control valve 23*b* includes a spool that moves between the supply position D and the return flow position E. The spool moves in accordance with the magnitude of the command current, whereby the pilot control valve 23*b* is switched to the supply position D or the return flow position E.

The pressure sensors 24*a* to 27*b* are placed between the pilot control valves 20*a* to 23*b* and the pilot ports 15*a* to 18*b*. The pressure sensors 24*a* to 27*b* detect the pressure of pilot pressure oil (hereinafter, referred to as "pilot pressure") supplied from the pilot control valves 20*a* to 23*b* to the pilot ports 15*a* to 18*b*. Then, the pressure sensors 24*a* to 27*b* output pressure signals indicating the pilot pressure as detected to the controller 50.

In the hydraulic oil supply flow path LIA, a main relief valve 28 for bringing the hydraulic oil flowing through the hydraulic oil supply flow path L1 back to the hydraulic oil tank 12 is mounted in the case where the discharge pressure of the main pump 13 exceeds a predetermined pressure. In the pilot supply flow path L3, a pilot relief valve 29 for bringing the pilot pressure oil flowing through the pilot supply flow path L3 back to the hydraulic oil tank 12 is mounted in the case where the discharge pressure of the pilot pump 14 exceeds a predetermined pressure. Furthermore, between the directional control valve 15 and the swing motor 3*a*, swing relief valves 30*a*, 30*b* that open in the case where the driving pressure or braking pressure of the swing motor 3*a* exceeds a predetermined pressure to prevent the driving pressure or the braking pressure from excessively increasing are mounted.

Figure 4A:
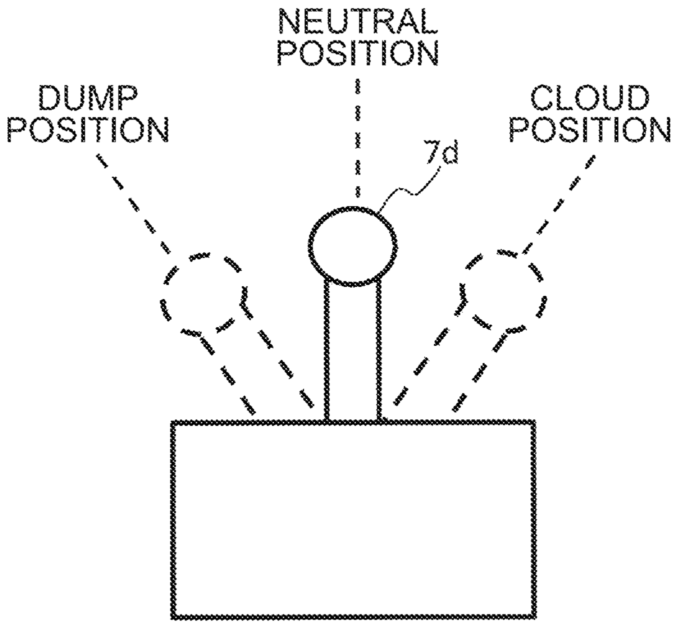
FIG. 4A is a schematic diagram of a bucket lever.
Figure 4B:
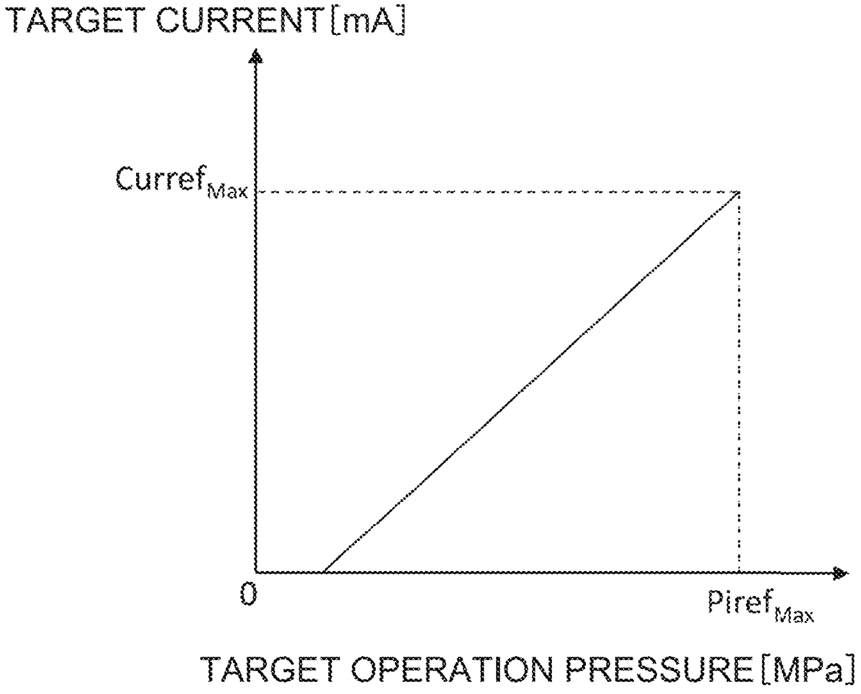
FIG. 4B illustrates a relation between a target operation pressure and a target current.

FIG. 3 is a control block diagram of the hydraulic excavator 1 according to the present embodiment. FIG. 4A is a schematic diagram of the bucket lever 7*d*. FIG. 4B illustrates a relation between a target operation pressure and a target current.

As illustrated in FIG. 3, the hydraulic excavator 1 is provided with the controller 50 including a CPU 51 (Central Processing Unit) and a memory 52. The memory 52 is configured with, for example, a ROM (Read Only Memory), a RAM (Random Access Memory), an HDD (Hard Disk Drive), or a combination thereof. The CPU 51 reads and executes program codes stored in the memory 52, whereby the controller 50 implements the processing which will be described later.

However, a specific configuration of the controller 50 is not limited thereto, but may be implemented with hardware such as an ASIC (Application Specific Integrated Circuit), an FPGA (Field-Programmable Gate Array), or the like.

The controller 50 controls the operations of the whole of the hydraulic excavator 1. The controller 50 causes the engine 10, the main pump 13, and the pilot pump 14 to rotate based on operation signals output from the various levers 7*a* to 7*d* and pressure signals output from the pressure sensors 24*a* to 27*b*, and also causes the pilot primary valve 19 and the pilot control valves 20*a* to 23*b* to open or close (outputs command currents).

As illustrated in FIG. 4A, the bucket lever 7*d* is designed to be fallen down (operated) by an operator between the dump position and the cloud position across the neutral position. Hereinafter, a fallen amount (operation amount) of the bucket lever 7*d* at the neutral position is expressed as the ratio of 0%, and that at the dump position (or cloud position) is expressed as the rate of 100%. Then, the bucket lever 7*d* outputs an operation signal indicative of the fallen amount (operation amount) to the controller 50. The neutral position corresponds to the blocking position A of the spool of the directional control valve 18. The dump position corresponds to the dump position B of the spool of the directional control valve 18. The cloud position corresponds to the cloud position C of the spool of the directional control valve 18. The positions other than the neutral position of the bucket lever 7*d* are examples of operation positions.

The controller 50 calculates a target operation pressure of the pilot pressure oil to be supplied to the pilot ports 18*a*, 18*b* based on the operation amount of the bucket lever 7*d* (more specifically, a current output operation amount MOcur, which will be described later). More specifically, the controller 50 increases the target operation pressure for the pilot port 18*a* as the fallen amount of the bucket lever 7*d* toward the dump position increases. Furthermore, the controller 50 increases the target operation pressure of the pilot port 18*b* as the fallen amount of the bucket lever 7*d* toward the cloud position increases.

As illustrated in FIG. 4B, in the memory 52, a correlation between a target operation pressure and a target current is stored. The correlation stored in the memory 52 expresses that a target current increases as the target operation pressure increases. The controller 50 reads the target current for the target operation pressure as calculated from the memory 52. Then, the controller 50 outputs the target current as read to the pilot control valves 23*a*, 23*b* as a command current. This causes the spool of the directional control valve 18 to move. The levers 7*a* to 7*d* have the structure which are common to each other, and thus the repetitive explanation therefor will be omitted.

Figure 5:
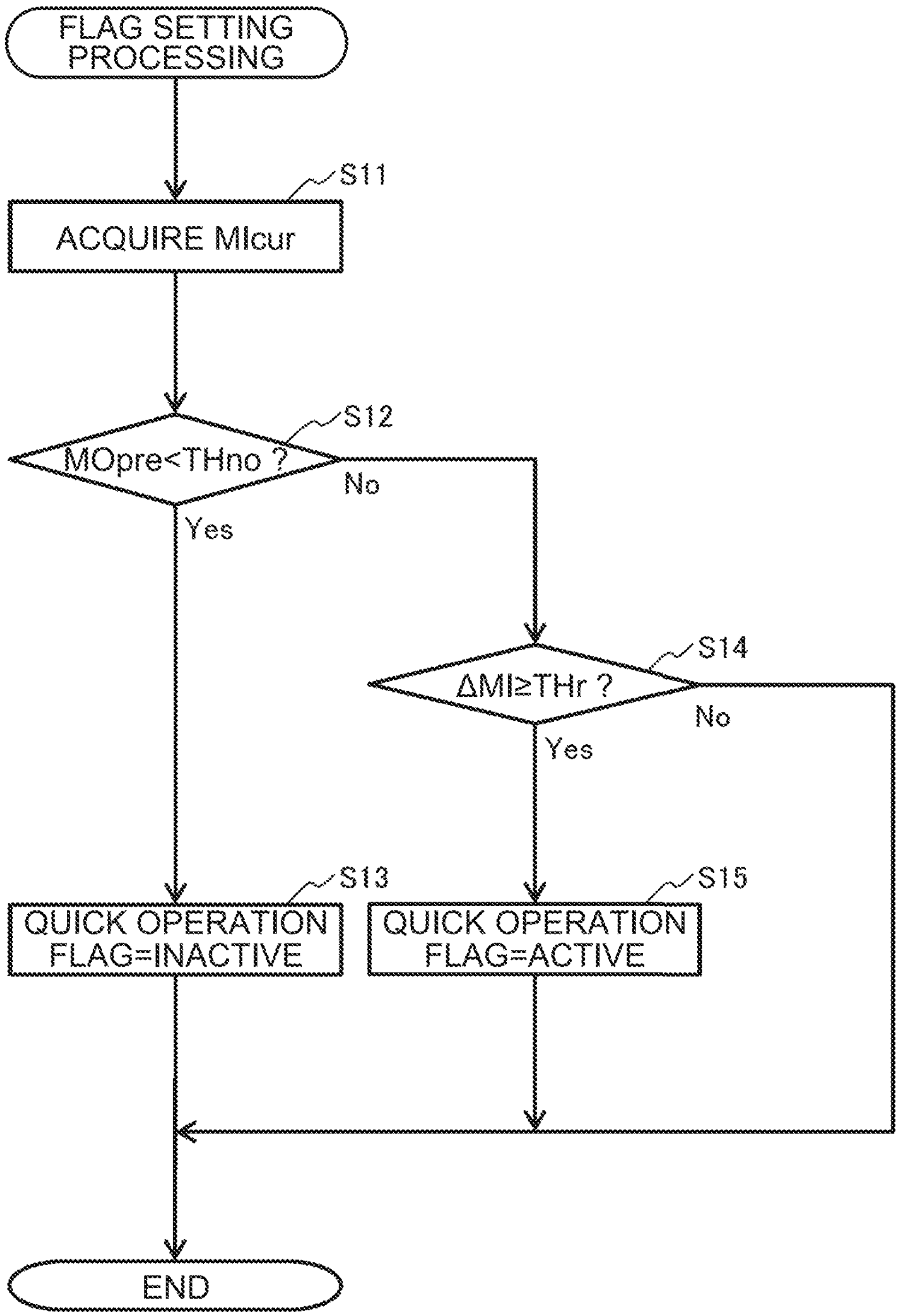
FIG. 5 illustrates a flowchart of flag setting processing according to the present embodiment.
Figure 6:
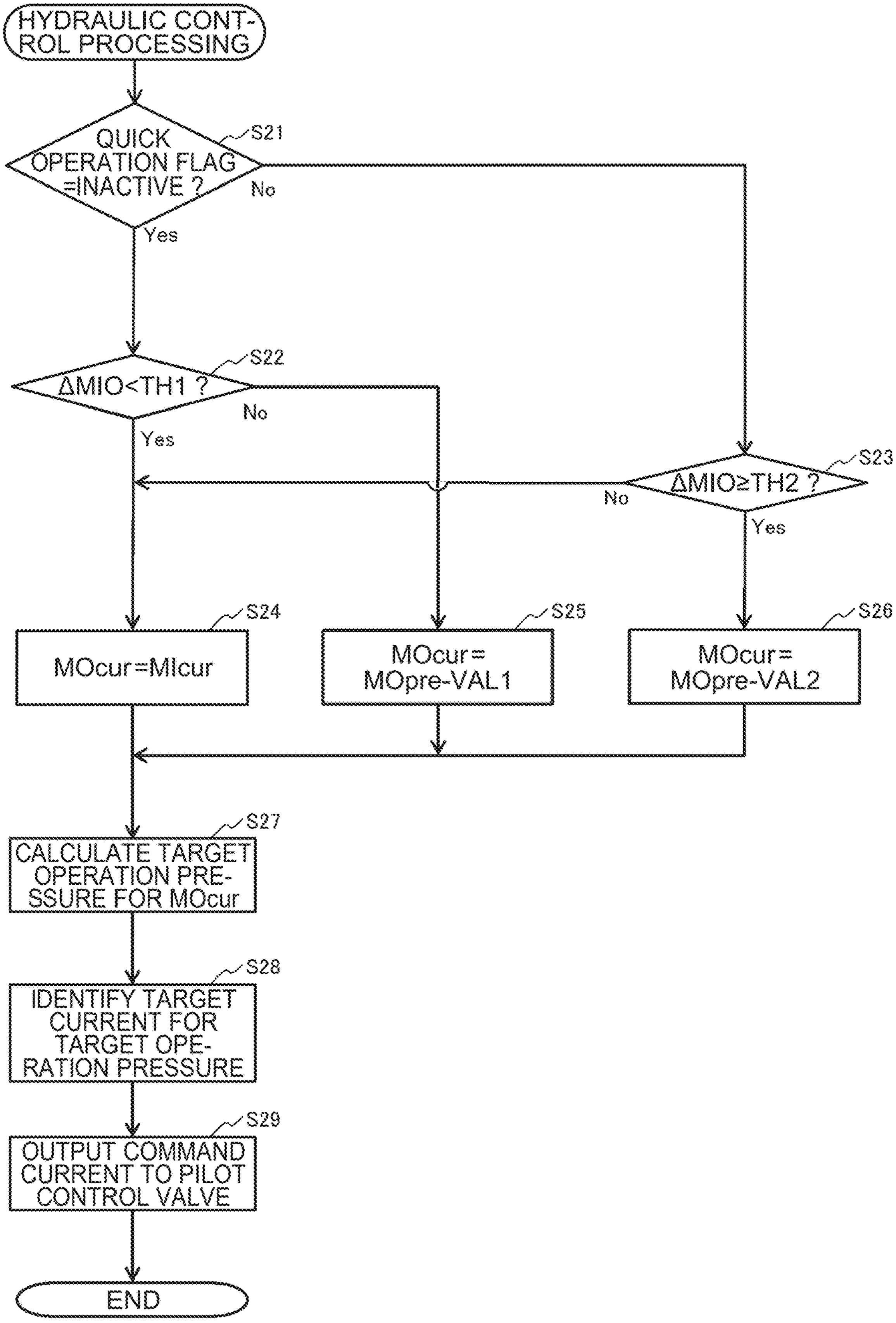
FIG. 6 illustrates a flowchart of hydraulic control processing according to the present embodiment.

FIG. 5 illustrates a flowchart of the flag setting processing according to the present embodiment. FIG. 6 illustrates a flowchart of the hydraulic control processing according to the present embodiment. The flag setting processing is the processing of determining whether the operator has quickly operated the bucket lever 7*d* toward the neutral position. The hydraulic control processing is the processing of supplying command currents to the pilot control valves 23*a*, 23*b* to control the pilot pressure to be supplied to the pilot ports 18*a*, 18*b* of the directional control valve 18 (that is, control the position of the spool of the directional control valve 18). The controller 50 alternately and repeatedly executes the flag setting processing and the hydraulic control processing.

A previous input operation amount MIpre is an operation amount indicated in an operation signal output from the bucket lever 7*d* in the previous flag setting processing and hydraulic control processing (that is, an actual operation amount). A previous output operation amount MOpre is an operation amount corrected in the previous hydraulic control processing (that is, an operation amount for a command current). A current input operation amount MIcur is an operation amount indicated in an operation signal output from the bucket lever 7*d* in the current flag setting processing and hydraulic control processing (that is, an actual operation amount). A current output operation amount MOcur is an operation amount corrected in the current hydraulic control processing (that is, an operation amount for a command current). The previous input operation amount MIpre and the previous output operation amount MOpre are stored in the memory 52.

As illustrated in FIG. 5, the controller 50 acquires the current input operation amount MIcur from the bucket lever 7*d* (S11). Next, the controller 50 compare the previous output operation amount MOpre with a neutral output threshold THno stored in the memory 52 (S12). The neutral output threshold THno is set to a value allowing the bucket lever 7*d* to be evaluated as being located near the neutral position (for example, 0% to 5%). Furthermore, as described above, the position of the spool of the directional control valve 18 is controlled in accordance with a command current determined based on the previous output operation amount MOpre. In other words, it can be said that the previous output operation amount MOpre corresponds to the present position of the spool of the directional control valve 18, and the neutral output threshold THno corresponds to a value allowing the spool of the directional control valve 16 to be evaluated as being located near the blocking position A.

Then, in response to the previous output operation amount MOpre being less than the neutral output threshold THno (S12: Yes), the controller 50 sets "inactive (first value)" in a quick operation flag stored in the memory 52 (S13), and ends the flag setting processing. The previous output operation amount MOpre being less than the neutral output threshold THno refers to the case that the bucket lever 7*d* has been pulled back in vicinity of the neutral position (in other words, the spool of the directional control valve 18 has moved near the blocking position A). The quick operation flag is a flag indicating that the bucket lever 7*d* has been quickly operated toward the neutral position. The "inactive" is indicative of the case that the bucket lever 7*d* has not been quickly operated toward the neutral position.

On the other hand, in response to the previous output operation amount MOpre being equal to or more than the neutral output threshold THno (S12: No), the controller 50 compares an input operation variation amount ΔMI with a quick operation threshold THr stored in the memory 52 (S14). The input operation variation amount ΔMI is the amount of change expressed with a difference of the current input operation amount MIcur relative to the previous input operation amount MIpre (MIpre−Micur), or is the ratio of the current input operation amount MIcur relative to the previous input operation amount MIpre (MIcur/MIpre). The quick operation threshold THr is a threshold relating to the speed of an operation (referred to as an "operation speed" herein) expressed as the amount of change in an operation per unit time, and is set to a value allowing the bucket lever 7*d* to be evaluated as having been quickly operated toward the neutral position (for example, the value set based on the difference of the current input operation amount MIcur relative to the previous input operation amount MIpre or the ratio of the current input operation amount MIcur relative to the previous input operation amount MIpre is 10% to 50% or the like).

In response to the input operation variation amount ΔMI being equal to or more than the quick operation threshold THr (S14: Yes), the controller 50 sets "active (second value)" in the quick operation flag (S15), and ends the flag setting processing. "Active" is indicative of the case that the bucket lever 7*d* has been quickly operated toward the neutral position. On the other hand, in response to the input operation variation amount ΔMI being less than the quick operation threshold THr (S14: No), the controller 50 ends the flag setting processing without changing the value of the quick operation flag.

Next, as illustrated in FIG. 6, the controller 50 determines the value of the quick operation flag set in the most recent flag setting processing (S21). In response to the quick operation flag being set to the "inactive" (S21: Yes), the controller 50 compares an input and output difference ΔMIO with a first limit threshold TH1 stored in the memory 52 (S22). On the other hand, in response to the quick operation flag being "active" (S21: No) the controller 50 compares the input and output difference ΔMIO with a second limit threshold TH2 stored in the memory 52 (S23).

The input and output difference ΔMIO is the amount of variation of the previous output operation amount MOpre relative to the current input operation amount MIcur (MIcur−MOpre or MOpre/MIcur). The first limit threshold TH1 and the second limit threshold TH2 are set to values allowing the previous output operation amount MOpre to be evaluated as having reached the current input operation amount MIcur (for example, 0% to 5%). The first limit threshold TH1 and the second limit threshold TH2 may be the same values or different values.

In response to the input and output difference ΔMIO being less than the first limit threshold TH1 (S22: Yes), the controller 50 sets the current output operation amount MOcur to a value which is the same as the current input operation amount MIcur (S24). That is, in the case where the bucket lever 7*d* has not been quickly operated toward the neutral position (S21: Yes) and also the previous output operation amount MOpre has reached the current input operation amount MIcur (S22: Yes), the controller 50 sets the current input operation amount MIcur to the current output operation amount MOcur without correcting the current input operation amount MIcur (S24).

In response to the input and output difference ΔMIO being equal to or more than the first limit threshold TH1 (S22: No), the controller 50 corrects the previous output operation amount MOpre with a first correction value VAL1 (for example, MOpre−VAL1) and sets it to the current output operation amount MOcur (S25). That is, in the case where the bucket lever 7*d* has not been quickly operated toward the neutral position (S21: Yes) and also the previous output operation amount MOpre has not reached the current input operation amount MIcur (S22: No), the controller 50 subtracts the first correction value VAL1 from the previous output operation amount MOpre and sets it to the current output operation amount MOcur regardless of the value of the current input operation amount MIcur (S25).

In response to the input and output difference ΔMIO being less than the second limit threshold TH2 (S23: No), the controller 50 sets the current output operation amount MOcur to a value which is the same as the current input operation amount MIcur (S24). That is, in the case where the bucket lever 7*d* has been quickly operated toward the neutral position (S21: No) and also the previous output operation amount MOpre has reached the current input operation amount MIcur (S23: No), the controller 50 sets the current input operation amount MIcur to the current output operation amount MOcur without correcting the current input operation amount MIcur (S24).

In response to the input and output difference ΔMIO being equal to or more than the second limit threshold TH2 (S23: Yes), the controller 50 corrects the previous output operation amount MOpre with a second correction value VAL2 (for example, MOpre−VAL2) and sets it to the current output operation amount MOcur (S26). That is, in the case where the bucket lever 7*d* has been quickly operated toward the neutral position (S21: No) and also the previous output operation amount MOpre has not reached the current input operation amount MIcur (S23: Yes), the controller 50 subtracts the second correction value VAL2 from the previous output operation amount MOpre and sets it to the current output operation amount MOcur regardless of the value of the current input operation amount MIcur (S26).

Next, the controller 50 calculates a target operation pressure for the current output operation amount MOcur set in steps S24 to S26 (S27).

Subsequently, the controller 50 identifies a target current for the target operation pressure calculated in step S27, based on the correlation illustrated FIG. 4B (S28). Then, the controller 50 outputs the target current identified in step S28 to the pilot control valves 23*a*, 23*b* as a command current (S29). This varies the pilot pressure to be supplied to the pilot ports 18*a*, 18*b* of the directional control valve 18, whereby the spool of the directional control valve 18 moves.

The second correction value VAL2 is set to a value which is greater than the first correction value VAL1. That is, the difference between the previous output operation amount MOpre and the current output operation amount MOcur in step S25 is smaller than the difference between the previous output operation amount MOpre and the current output operation amount MOcur in step S26. Accordingly, the speed of movement of the spool of the directional control valve 18 based on the current output operation amount MOcur set in step S25 is slower than that of the spool of the directional control valve 18 based on the current output operation amount MOcur set in step S26. As a result, the braking of the bucket cylinder 4*f* in the case where the process in step S25 has been executed is limited more than that in the case where the process in step S26 has been executed.

Referring to FIG. 5 to FIG. 8, the processing to be carried out in the case where the bucket lever 7*d* is pulled down from the neutral position toward a target position on the side of the dump position and then pulled back from the target position to the neutral position will be described. The controller 50 alternately executes the flag setting processing and the hydraulic control processing about 10 to 100 times until the bucket lever 7*d* is pulled down from the neutral position to the target position and then pulled back to the neutral position. The target position may be the dump position or any position between the neutral position and the dump position. The same processing is applied to the case that the bucket lever 7*d* is pulled down toward the cloud position. The same processing is also applied to the cases that the levers 7*a* to 7*c* other than the bucket lever 7*d* are operated.

Figure 7:
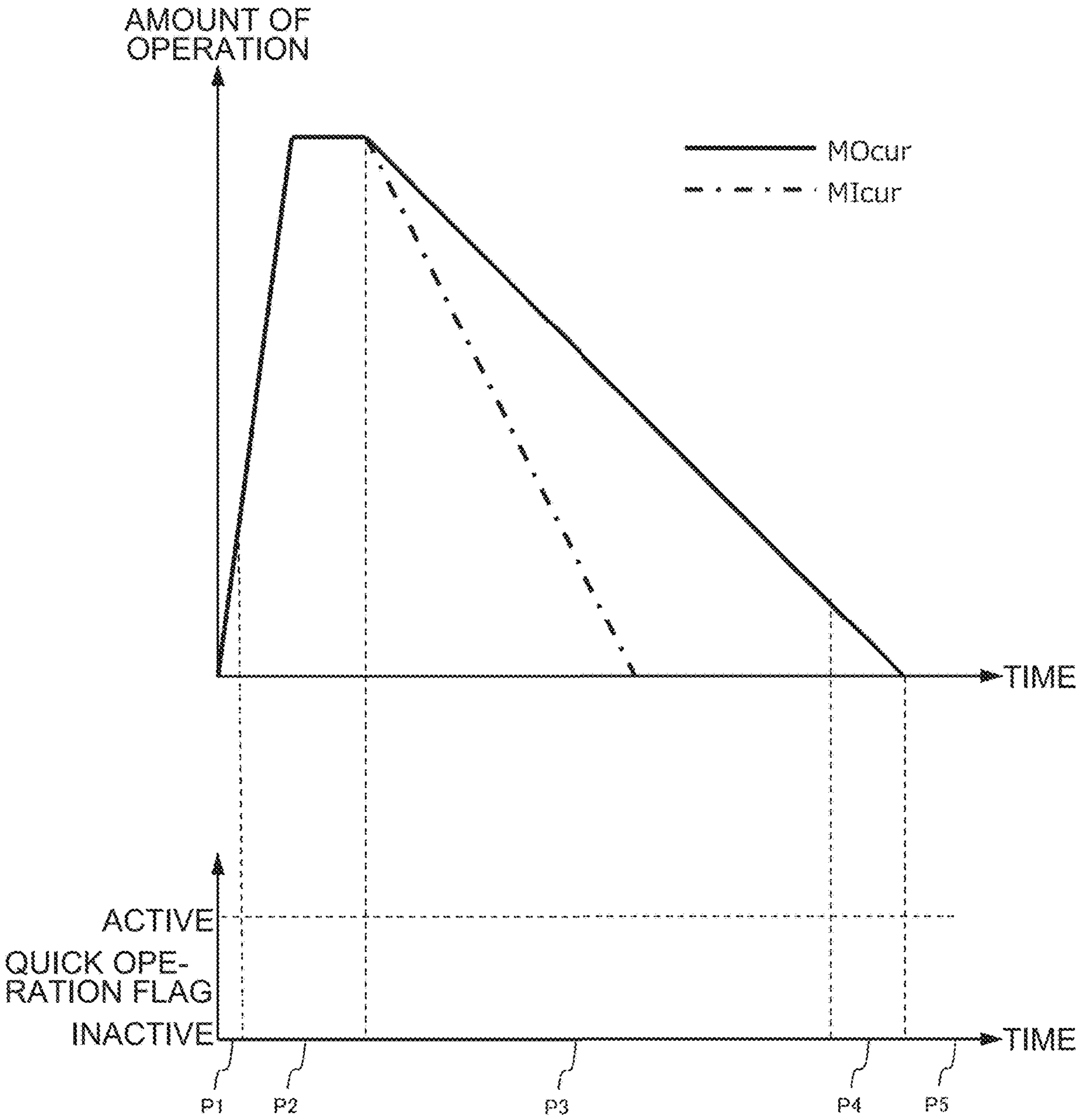
FIG. 7 illustrates changes with time in a current input operation amount and a current output operation amount in the case where a bucket lever has been slowly operated toward a neutral position.
Figure 8:
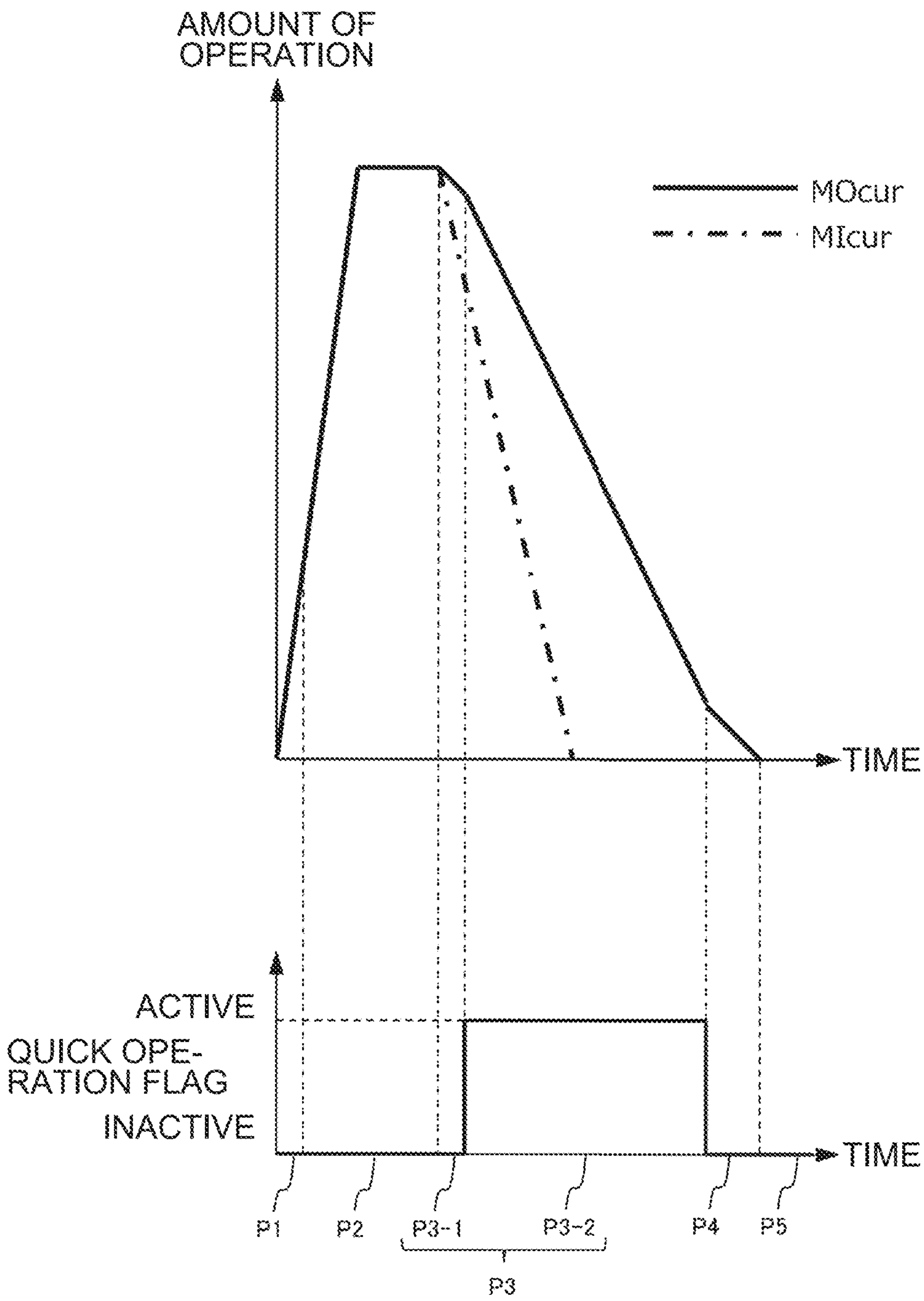
FIG. 8 illustrates changes with time in a current input operation amount and a current output operation amount in the case where a bucket lever has been quickly operated.

FIG. 7 illustrates the changes with time in the current input operation amount MIcur and the current output operation amount MOcur in the case where the bucket lever 7*d* is slowly operated toward the neutral position (the speed of an operation for the bucket lever 7*d* is less than the quick operation threshold THr). FIG. 8 illustrates the changes with time in the current input operation amount MIcur and the current output operation amount MOcur in the case where the bucket lever 7*d* is quickly operated (the speed of an operation for the bucket lever 7*d* is equal to or more than the quick operation threshold THr).

A period P1 illustrated in FIG. 7 is the period of time in which the bucket lever 7*d* starts to be pulled down from the neutral position toward the target position. In the flag setting processing and the hydraulic control processing during this period of time, the processes are executed in order of S11→S12: Yes→S13→S21: Yes→S22: Yes→S24→S27 to S29. That is, the controller 50 sets "inactive" in the quick operation flag (S13) and sets a value which is the same as the current input operation amount MIcur to the current output operation amount MOcur (S24).

A period P2 illustrated in FIG. 7 is the period of time in which the bucket lever 7*d* continues to be pulled down until it reaches a target position. In the flag setting processing and the hydraulic control processing during this period of time, the processes are executed in order of S11→S12: No→S14: No→S21: Yes→S22: Yes→S24→S27 to S29. That is, the controller 50 sets a value which is the same as the current input operation amount MIcur to the current output operation amount MOcur without changing the value of the quick operation flag (S24).

As described above, in the periods P1 and P2, a value which is the same as the current input operation amount MIcur is set to the current output operation amount MOcur, whereby the spool of the directional control valve 18 moves from the blocking position A toward the dump position B (the bucket cylinder 4*f* contracts) at the speed following the speed of an actual operation of the bucket lever 7*d* (the amount of an operation per unit time).

A period P3 illustrated in FIG. 7 is the period of time in which the bucket lever 7*d* is pulled back from the target position to the vicinity of the neutral position. In the flag setting processing and the hydraulic control processing during this period of time, the processes are executed in order of S11→S12: No→S14: No→S21: Yes→S22: No→S25→S27 to S29. That is, the controller 50 subtracts the first correction value VAL1 from the previous output operation amount MOpre and then sets it to the current output operation amount MOcur without changing the value of the quick operation flag (S25).

A period P4 illustrated in FIG. 7 is the period of time in which the bucket lever 7*d* reaches the vicinity of the neutral position. In the flag setting processing and the hydraulic control processing during this period of time, the processes are executed in order of S11→S12: Yes→S13→S21: Yes→S22: No→S25→S27 to S29. That is, the controller 50 sets "inactive" in the quick operation flag (S13), subtracts the first correction value VAL1 from the previous output operation amount MOpre, and sets it to the current output operation amount MOcur (S25).

A period P5 illustrated in FIG. 7 is the period of time after the bucket lever 7*d* reaches the neutral position. In the flag setting processing and the hydraulic control processing during this period of time, the processes are executed in order of S11→S12: Yes→S13→S21: Yes→S22: Yes→S24→S27 to S29. That is, the controller 50 sets "inactive" in the quick operation flag (S13) and sets a value which is the same as the current input operation amount MIcur to the current output operation amount MOcur (S24).

In the periods P3 to P4 illustrated in FIG. 7, the spool of the directional control valve 18 moves toward the blocking position A (that is, the bucket cylinder 4*f* is braked). The variation in speed (decrease in speed) of the current output operation amount MOcur in the periods P3 to P4 is less than the variation in speed of the current input operation amount MIcur. Accordingly, the speed of movement of the spool of the directional control valve 18 in the periods P3 to P4 (hereinafter, referred to as "first movement speed") is slower than the speed of movement for the current input operation amount MIcur (hereinafter, referred to as "reference speed"). That is, in the periods P3 to P4, the braking of the bucket cylinder 4*f* is limited.

On the other hand, in FIG. 8, the variation in speed of the current input operation amount MIcur while the bucket lever 7*d* moves from the target position toward the neutral position is more than that illustrated in FIG. 7. Accordingly, in FIG. 8, the period P3 of FIG. 7 is divided into periods P3-1 and P3-2. In the period P3-1 in FIG. 8, the processes which are the same as those in the period P3 of FIG. 7 are executed. In both FIG. 7 and FIG. 8, the same processes are executed in the periods P1, P2, P4, P5.

In the flag setting processing and the hydraulic control processing during the period P3-2 of FIG. 8, the processes are executed in order of S11→S12: No→S14: Yes→S15→S21: No→S23: Yes→S26 to S29. That is, the controller 50 sets "active" in the quick operation flag (S15), subtracts the second correction value VAL2 from the previous output operation amount MOpre, and sets it to the current output operation amount MOcur (S26).

The variation in speed (decrease in speed) of the current output operation amount MOcur in the period P3-2 of FIG. 8 is less than that of the current input operation amount MIcur. Accordingly, the speed of movement of the spool of the directional control valve 18 in the period P3-2 of FIG. 8 (hereinafter, referred to as "second movement speed") is slower than the speed of movement for the current input operation amount MIcur (hereinafter, referred to as "reference speed"). That is, in the period P3-2 of FIG. 8, the braking of the bucket cylinder 4*f* is limited.

In the period P3 of FIG. 7, the current output operation amount MOcur is set using the first correction value VAL1, while, in the period P3-2 of FIG. 8, the current output operation amount MOcur is set using the second correction value VAL2 which is greater than the first correction value VAL1. Accordingly, the second movement speed in the period P3-2 of FIG. 8 is faster than the first movement speed in the period P3 of FIG. 7. That is, in the period P3-2 of FIG. 8, the limitation for the braking of the bucket cylinder 4*f* is relaxed as compared with that in the period P3 of FIG. 7.

According to the embodiment described above, for example, the following advantageous effects can be obtained.

According to the embodiment described above, in the case where the speed of an operation for the bucket lever 7*d* toward the neutral position is less than the quick operation threshold THr, the spool of the directional control valve 18 is made moved at the first speed which is slower than the reference speed. This enables prevention of the degradation in a ride quality caused by an inertial force generated in braking of the bucket cylinder 4*f*.

On the other hand, according to the embodiment described above, in the case where the speed of an operation for the bucket lever 7*d* toward the neutral position is equal to or more than the quick operation threshold THr, the spool of the directional control valve 18 is made moved at the second speed which is slower than the reference speed and faster than the first speed. This enables an operation using an inertial force generated in braking of the bucket cylinder 4*f* (for example, a work of dropping mud) to be performed.

As described above, according to the embodiment described above, adjusting the speed in operating the bucket lever 7*d* toward the neutral position enables appropriate switching between prevention of the degradation in a ride quality caused by an inertial force and a work using the inertial force.

In the embodiment described above, the example in which the second speed is set slower than the reference speed has been described, however, the second speed may be set to a value which is the same as the reference speed. That is, the process of step S26 may be replaced with that of step S24. This enables use of a larger inertial force in the work of dropping mud or the like.

[First Modification]

Figure 9:
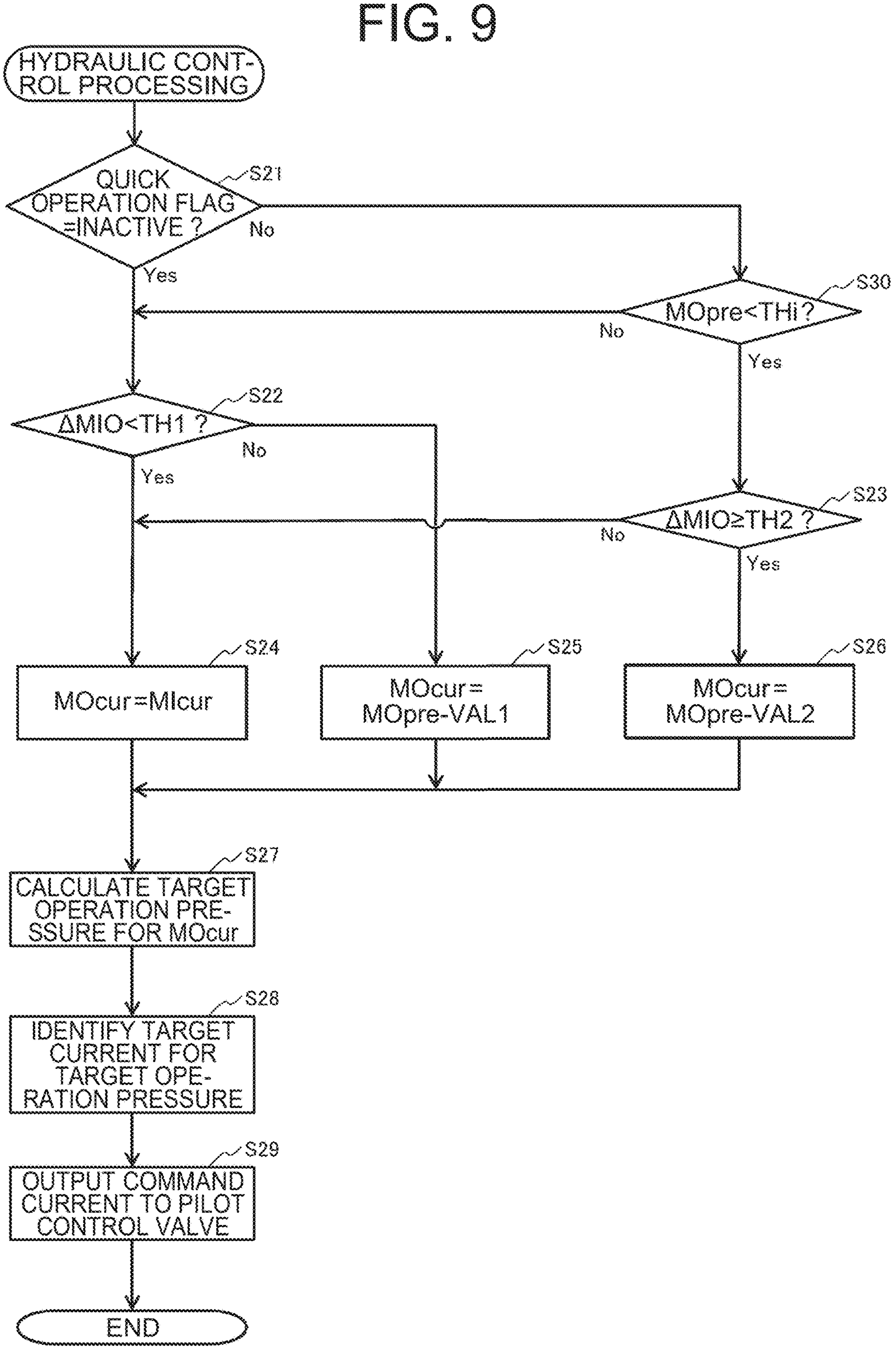
FIG. 9 illustrates a flowchart of hydraulic control processing according to the first modification.
Figure 10:
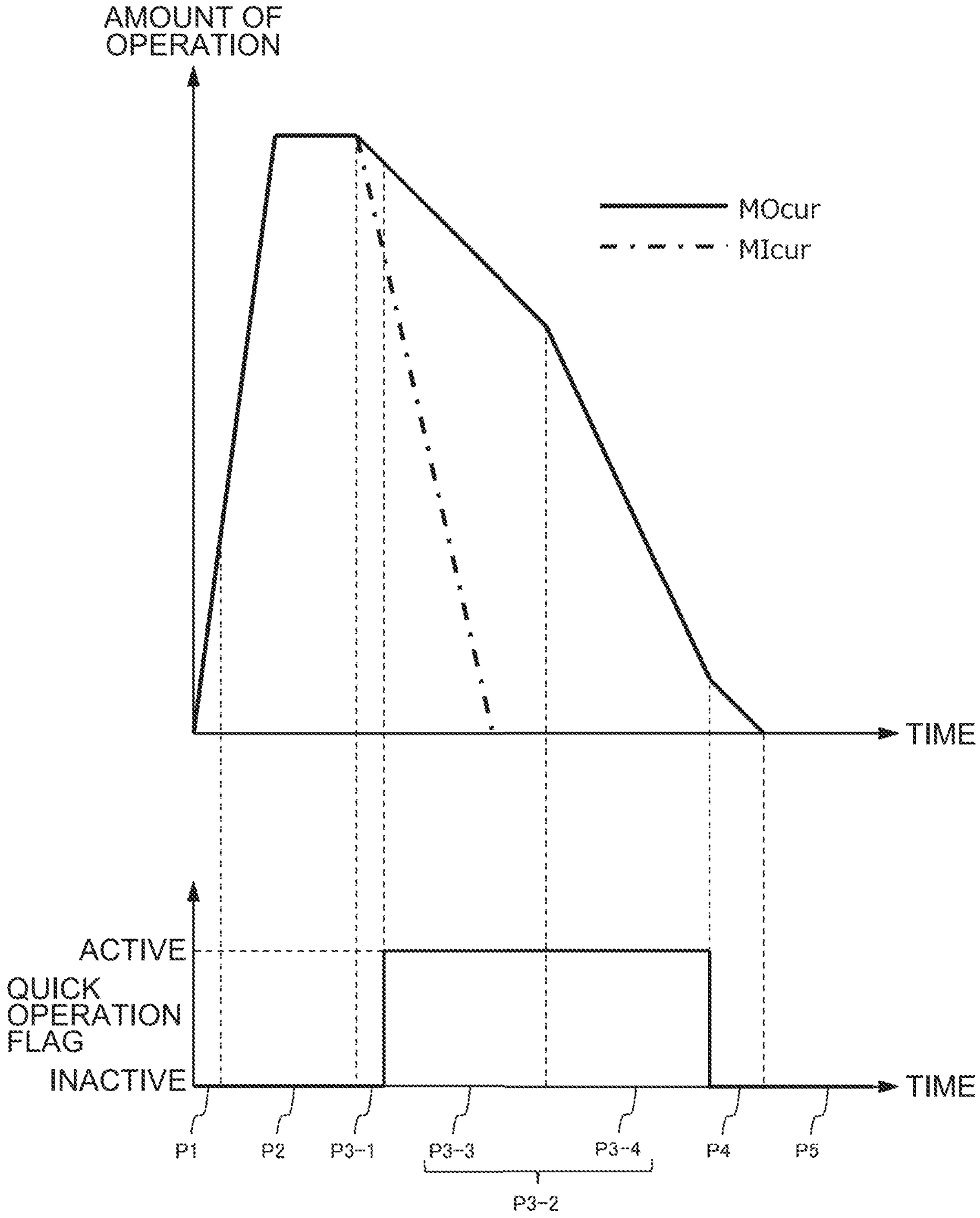
FIG. 10 illustrates changes with time in a current input operation amount and a current output operation amount in the case where a bucket lever has been quickly operated in the first modification.

Next, referring to FIG. 9 and FIG. 10, the hydraulic control processing according to the first modification will be described. FIG. 9 illustrates a flowchart of the hydraulic control processing according to the first modification. FIG. 10 illustrates the changes with time in the current input operation amount MIcur and the current output operation amount MOcur in the case where the bucket lever 7*d* has been quickly operated in the first modification. In the following, the features which are common to those of the embodiment described above will not be described while mainly describing the differences therefrom. The hydraulic control processing according to the first modification differs from the hydraulic control processing illustrated in FIG. 6 in that it further includes step S30, while the other features are the same as those illustrated in FIG. 6.

As illustrated in FIG. 9, the controller 50 according to the first modification compares the previous output operation amount MOpre with an initial operation threshold THi stored in the memory 52 in response to the quick operation flag being set to "active" (S21: Yes) (S30). The initial operation threshold THi is a value that is set based on the current position and target position of the bucket lever 7*d*, and is set to a value allowing the current position of the bucket lever 7*d* to be evaluated as being near the target position (for example, 80% to 95% of the target position). Then, in response to the previous output operation amount MOpre being equal to or more than the initial operation threshold THi (S30: No), the controller 50 executes the processes after step S22. On the other hand, in response to the previous output operation amount MOpre being less than the initial operation threshold THi (S30: Yes), the controller 50 executes the processes after step S23.

In combination of the flag setting processing of FIG. 5 and the hydraulic control processing of FIG. 9, as illustrated in FIG. 10, the period P3-2 of FIG. 8 is divided into periods P3-3 and P3-4. On the other hand, in FIG. 10, the processes to be executed in the periods P1, P2, P3-1, P4, and P5 are substantially the same as those of FIG. 8.

In the flag setting processing and the hydraulic control processing during the period P3-3 of FIG. 10, the processes are executed in order of S11→S12: No→S14: Yes→S15→S21: No→S30: No→S22: No→S25→S27 to S29. That is, the controller 50 sets "active" in the quick operation flag (S15), subtracts the first correction value VAL1 from the previous output operation amount MOpre, and sets it to the current output operation amount MOcur (S25). That is, in the period P3-3 of FIG. 10, the braking of the bucket cylinder 4*f* is limited greatly more than that in the period P3-2 of FIG. 8.

In the flag setting processing and the hydraulic control processing in the period P3-4 of FIG. 10, the processes are executed in order of S11→S12: No→S14: No→S21: No→S30: Yes→S23: Yes→S26 to S29. That is, the controller 50 subtracts the second correction value VAL2 from the previous output operation amount MOpre and sets it to the current output operation amount MOcur without changing the value of the quick operation flag (S26).

According to the first modification, in the case where the speed of an operation for the bucket lever 7*d* being equal to or more than the quick operation threshold THr, the spool of the directional control valve 18 is made moved at the first speed if the previous output operation amount MOpre is less than the initial operation threshold THi (period P3-3 in FIG. 10), and the spool of the directional control valve 18 is made moved at the second speed if the previous output operation amount MOpre is equal to or more than the initial operation threshold THi (period P3-4 in FIG. 10).

This makes the state in which the spool of the directional control valve 18 moves at the first speed (periods P3-1 and P3-3 in FIG. 10) longer in time than that in the period P3-1 in FIG. 8. That is, in the first half of the during in which the bucket lever 7*d* is made moved from the target position to the neutral position, the degradation in a ride quality caused by an inertial force generated in the braking of the bucket cylinder 4*f* can be prevented.

[Second Modification]

Figure 11:
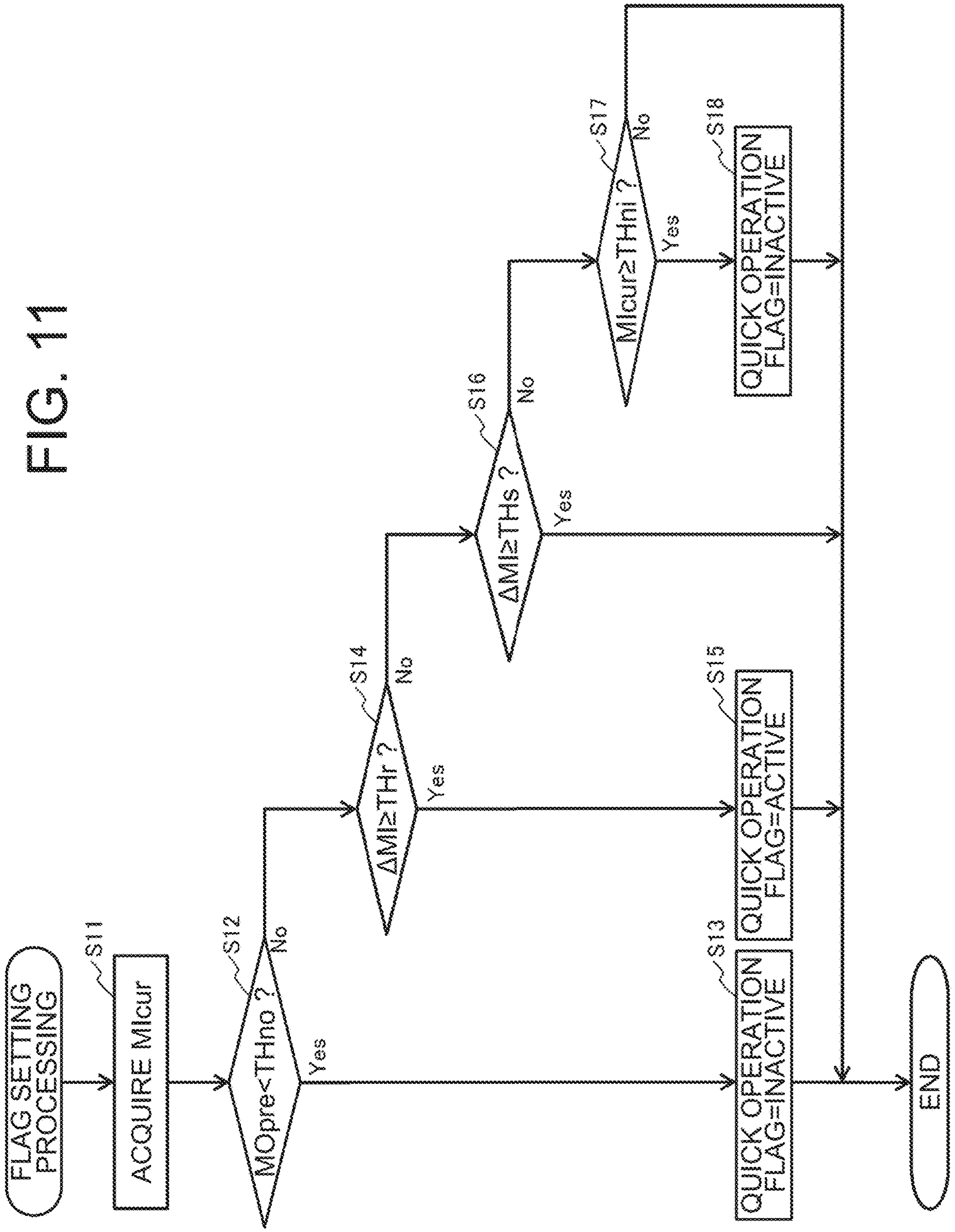
FIG. 11 illustrates a flowchart of flag setting processing according to the second modification.
Figure 12:
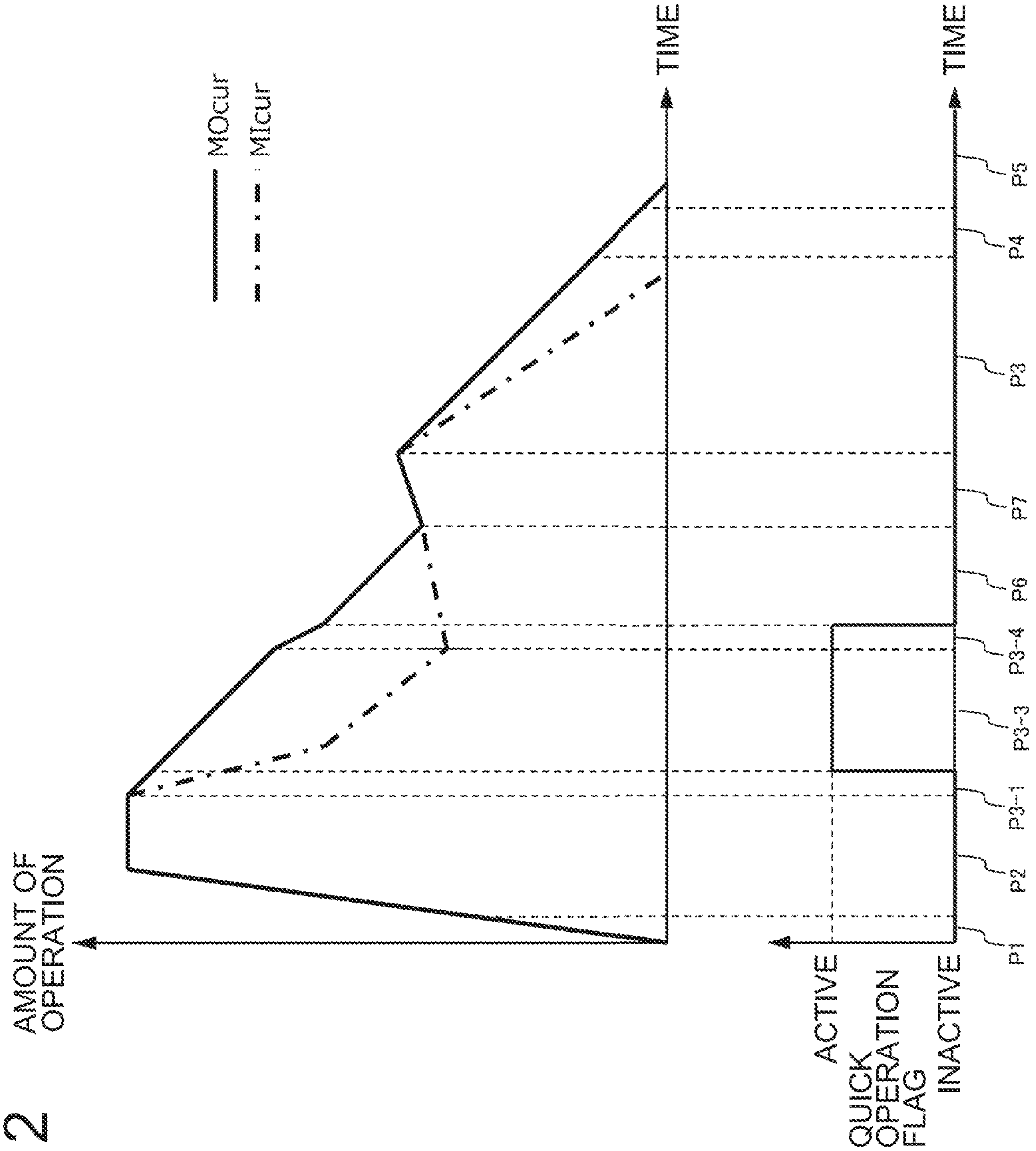
FIG. 12 illustrates changes with time in a current input operation amount and a current output operation amount in the case where a bucket lever is quickly operated toward a neutral position after reaching a target position, temporarily stopped with the operation speed gradually being reduced, and slowly operated again toward the neutral position.

Next, referring to FIG. 11 and FIG. 12, the flag setting processing according to the second modification will be described. FIG. 11 illustrates a flowchart of the flag setting processing according to the second modification. FIG. 12 illustrates the changes with time in the current input operation amount MIcur and the current output operation amount MOcur in the case where the bucket lever 7*d* is quickly operated toward the neutral position after reaching the target position, temporarily stopped with the operation speed gradually being reduced, and slowly operated again toward the neutral position. In the following, the features which are common to those of the embodiment described above will not be described while mainly describing the differences therefrom. The flag setting processing according to the second modification differs from the flag setting processing illustrated in FIG. 5 in that it further includes steps S16 to S18, while the other features are the same as those illustrated in FIG. 5.

The controller 50 according to the second modification compares the input operation variation amount ΔMI with a stop threshold THs stored in the memory 52 (S16) in response to the input operation variation amount ΔMI being less than the quick operation threshold THr (S14: No). The stop threshold THs is set to a value allowing the bucket lever 7*d* to be estimated as being stopped (for example, 0% to 2%). That is, in step S16, the controller 50 determines whether the bucket lever 7*d* being operated from the target position toward the neutral position has been stopped halfway, or whether an input operation for the bucket lever 7*d* has turned from decreasing to increasing.

Next, in response to the input operation variation amount ΔMI being less than the quick operation threshold THr and also equal to or more than the stop threshold THs (S14: No & S16: Yes), the controller 50 ends the flag setting processing without changing the value of the quick operation flag.

On the other hand, in response to the input operation variation amount ΔMI being less than the stop threshold THs (S16: No), the controller 50 compares the current input operation amount MIcur with a neutral input threshold THni stored in the memory 52 (S17). The neutral input threshold THni is set to a value allowing the bucket lever 7*d* to be evaluated as being brought back to the neutral position (for example, 0% to 2%). That is, the controller 50 determines whether the bucket lever 7*d* has returned to the neutral position in step S17.

Next, in response to the current input operation amount MIcur being equal to or more than the neutral input threshold THni (S17: Yes), the controller 50 sets "inactive (second value)" in the quick operation flag (S18), and ends the flag setting processing. On the other hand, in response to the current input operation amount MIcur being less than the neutral input threshold THni (S17: No), the controller 50 ends the flag setting processing without changing the value of the quick operation flag.

In combination of the flag setting processing of FIG. 11 and the hydraulic control processing of FIG. 9, as illustrated in FIG. 12, during the periods P3-4 and P4 of FIG. 10, periods P6, P7, in which an operation for the bucket lever 7*d* is started again after it is temporarily stopped, and a period P3, in which the bucket lever 7*d* is being slowly operated toward the neutral position, are added. The processes to be executed in the periods P1, P2, P3-1, P3-3, P3-4, P4, and P5 of FIG. 12 are substantially the same as those of FIG. 10.

In the flag setting processing and the hydraulic control processing during the period P6 of FIG. 12, the processes are executed in order of S11→S12: No→S14: No→S16: No→S17: Yes→S18→S21: Yes→S22: No→S25→S27 to S29. That is, the controller 50 sets "inactive" in the quick operation flag (S18), subtracts the first correction value VAL1 from the previous output operation amount MOpre, and sets it to the current output operation amount MOcur (S25). This causes the braking of the bucket cylinder 4*f* to be greatly limited in the period P6 of FIG. 12 as compared with that in the immediately preceding period P3-4.

In the flag setting processing and the hydraulic control processing during the period P7 of FIG. 12, the processes are executed in order of S11→S12: No→S14: No→S16: Yes→S21: Yes→S22: Yes→S24→S27 to S29. That is, the controller 50 sets a value which is the same as the current input operation amount MIcur to the current output operation amount MOcur without changing the value of the quick operation flag (S24). The same applies to the case where the lever operation turns to acceleration.

According to the second modification, "inactive" is set in the quick operation flag at the timing in which the bucket lever 7*d* quickly operated toward the neutral position has been temporarily stopped (period P6), and thus, thereafter, in the case where the bucket lever 7*d* is slowly operated toward the neutral position, the braking of the bucket cylinder 4*f* can be greatly limited. This results in prevention of the degradation in a ride quality caused by an inertial force generated in braking of the bucket cylinder 4*f*.

[Third Modification]

Figure 13:
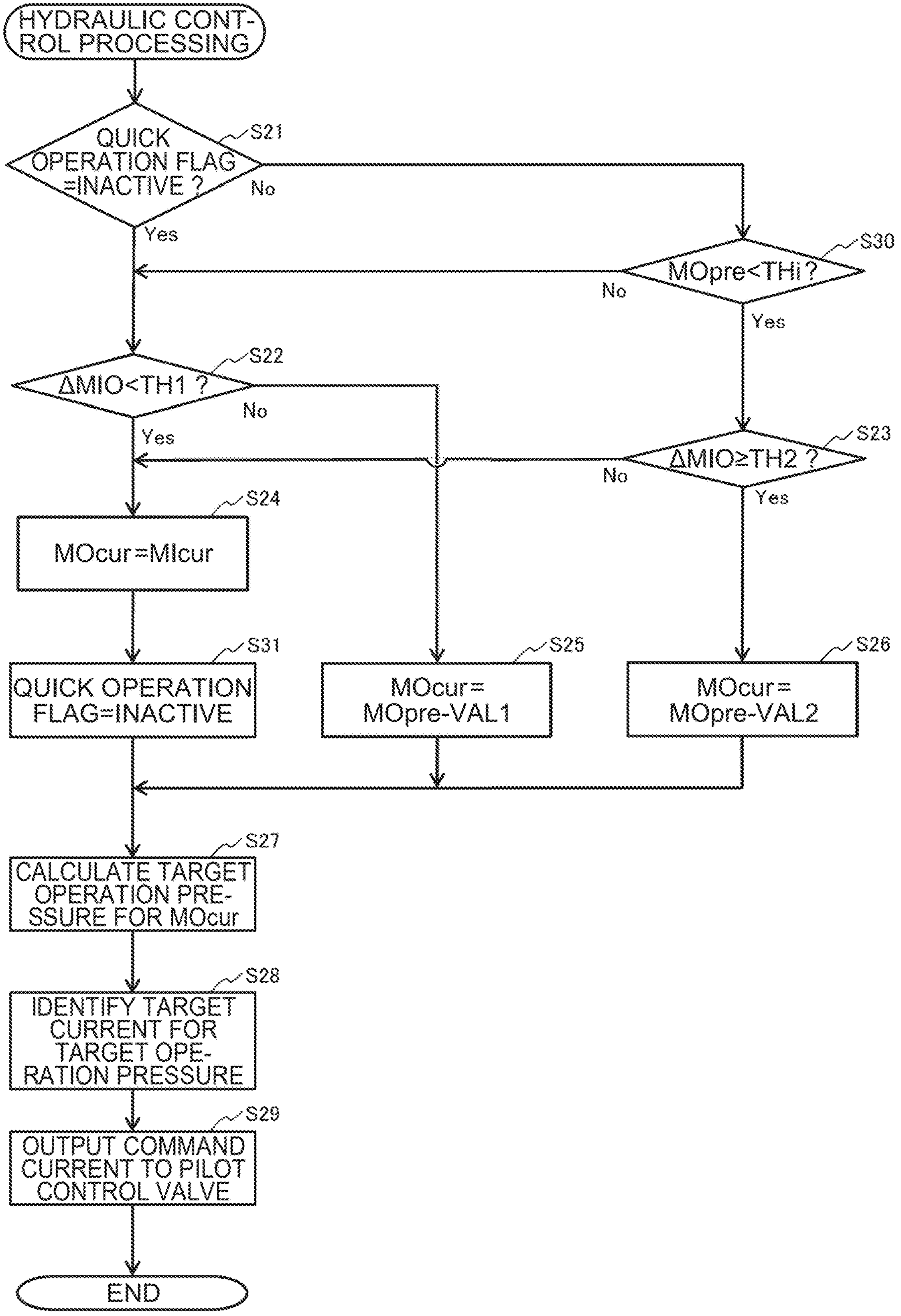
FIG. 13 illustrates a flowchart of hydraulic control processing according to the third modification.

Next, referring to FIG. 13, the hydraulic control processing according to the third modification will be described. FIG. 13 illustrates a flowchart of the hydraulic control processing according to the third modification. In the following, the features which are common to those of the embodiment described above and the first modification will not be described while mainly describing the differences therefrom. The hydraulic control processing according to the third modification differs from the hydraulic control processing illustrated in FIG. 6 and FIG. 9 in that it further includes step S31, while the other features are the same as 6 illustrated in FIG. 5 and the hydraulic control processing illustrated in FIG. 9.

As illustrated in FIG. 13, in response to the input and output difference ΔMIO being less than the first limit threshold TH1 (S22: Yes), the controller 50 according to the third modification sets the current output operation amount MOcur to a value which is the same as the current input operation amount MIcur (S24), and also sets "inactive" in the quick operation flag (S31). That is, according to the hydraulic control processing of FIG. 13, "inactive" is set in the quick operation flag in the period P7 of FIG. 12 (S31). This enables the actions and effects which are the same as those according to the second modification to be obtained in the combination of the flag setting processing of FIG. 5 and the hydraulic control processing of FIG. 13 as well.

[Fourth Modification]

Figure 14:
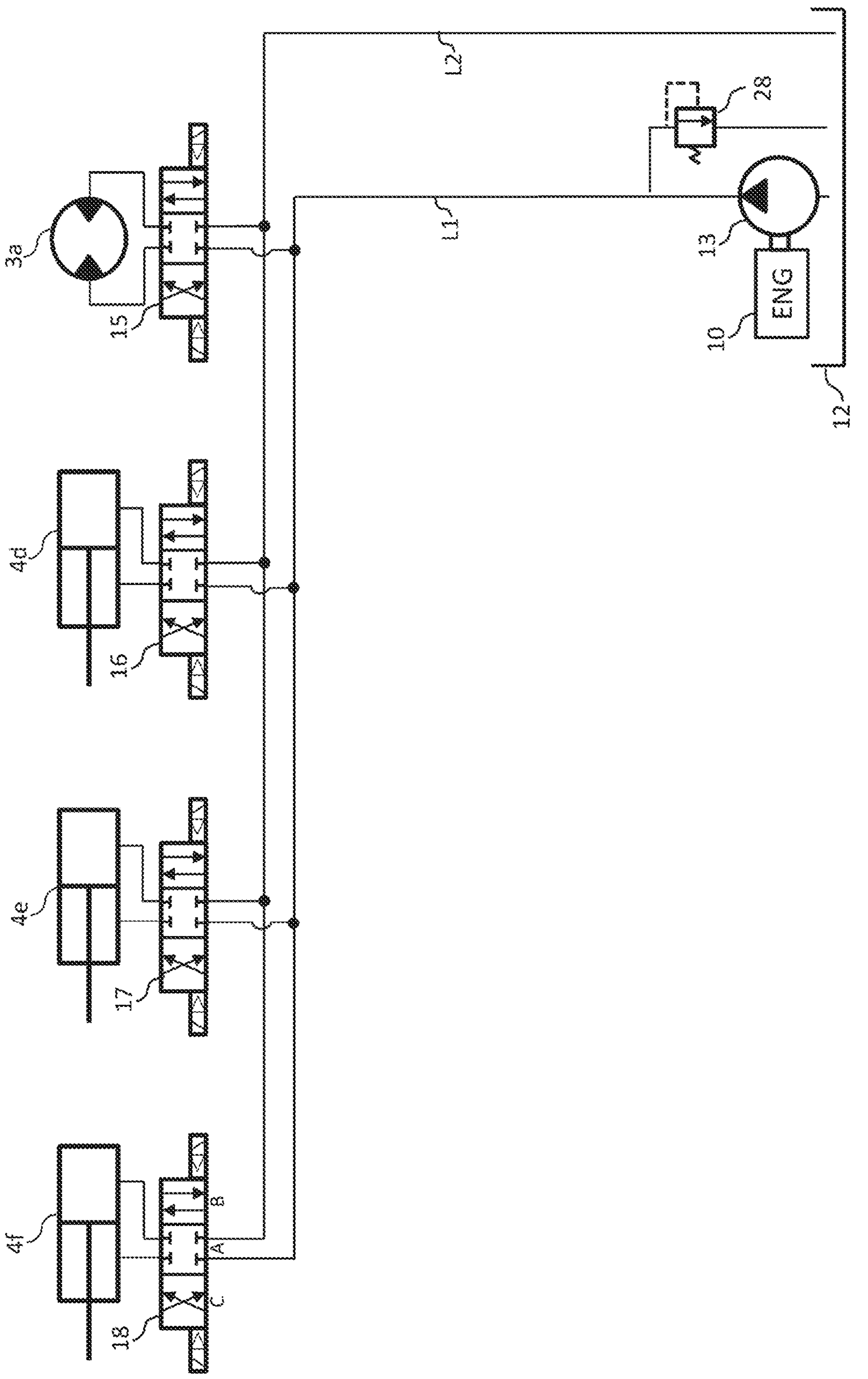
FIG. 14 illustrates a drive circuit of a hydraulic excavator according to the fourth modification.
Figure 15:
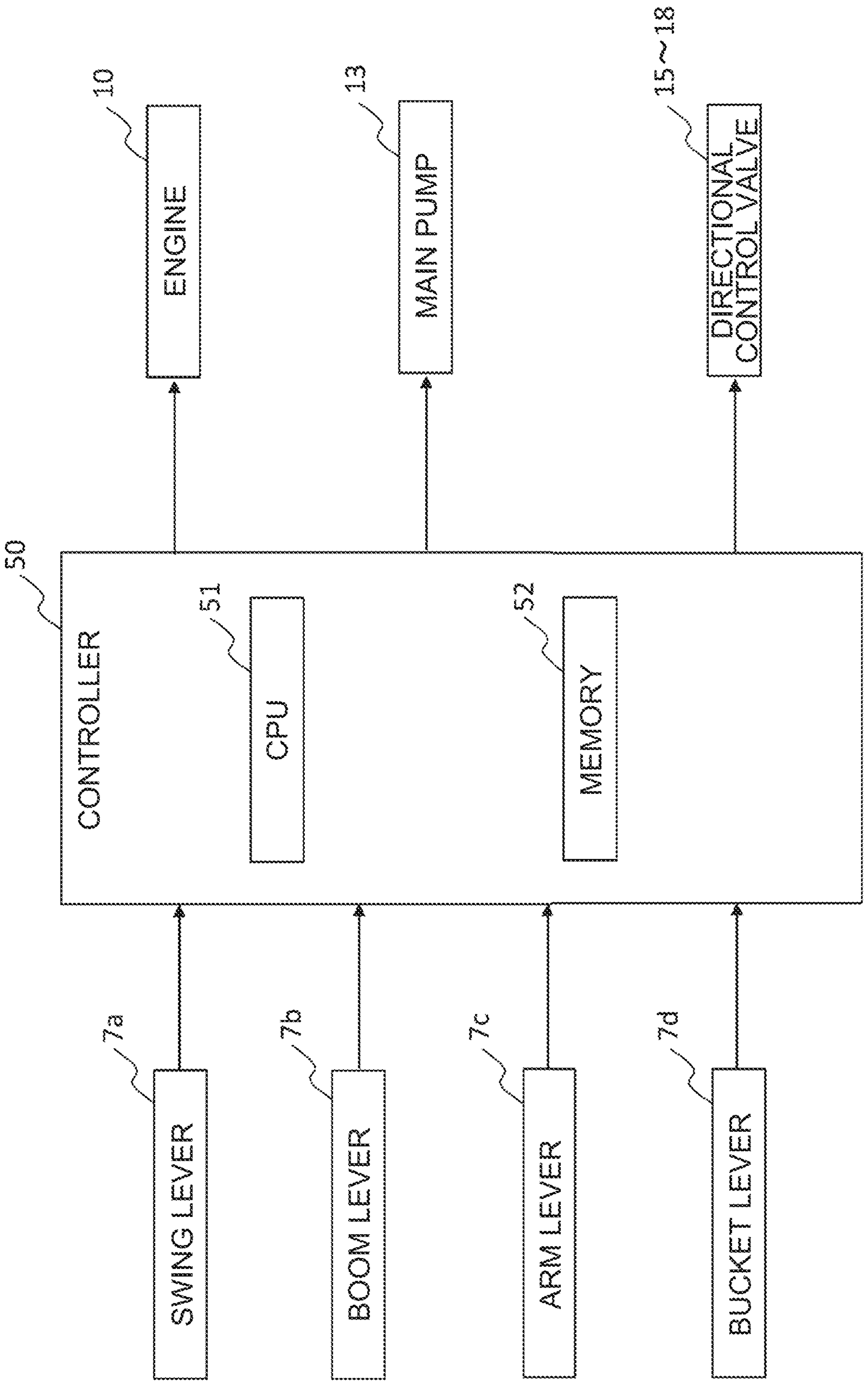
FIG. 15 is a control block diagram of a hydraulic excavator according to the fourth modification.

Next, referring to FIG. 14 and FIG. 15, a drive circuit and a hardware configuration according to the fourth modification will be described. FIG. 14 illustrates a drive circuit of the hydraulic excavator 1 according to the fourth modification. FIG. 15 is a control block diagram of the hydraulic excavator 1 according to the fourth modification. In the following, the features which are common to those of the embodiment described above and will not be described while mainly describing the differences therefrom.

As illustrated in FIG. 14, in the drive circuit according to the fourth modification, the engine 10, the pilot pump 14, the pilot primary valve 19, the pilot control valves 20*a*, 20*b*, 21*a*, 21*b*, 22*a*, 22*b*, 23*a*, 23*b*, and the pressure sensors 24*a*, 24*b*, 25*a*, 25*b*, 26*a*, 26*b*, 27*a*, 27*b* are omitted. Furthermore, in the drive circuit according to the fourth modification, the directional control valves 15 to 18 are configured with directional solenoid valves having spools that move in accordance with the control by the controller 50. As illustrated in FIG. 15, the controller 50 outputs command currents to the directional control valves 15 to 18 in S29 of FIG. 6, FIG. 9, and FIG. 13.

According to the fourth modification, the processing according to the embodiment described above and the first to third modifications can be implemented with the drive circuit that is configured simply.

An engine has been exemplified as a prime mover so far, however, the prime mover is not limited thereto, but may be an electric motor, a fuel cell, or the like. Alternatively, a combination of these may be used as a prime mover.

The embodiment described above has been described as one of the examples of the present invention, and it is not intended that the scope of the present invention is limited to the embodiment described above. Those skilled in the art could implement the present invention in various other ways without making them depart from the concept of the present invention.

REFERENCE SIGNS LIST

1 hydraulic excavator
2 undercarriage
2 a traveling motor
3 upperstructure
3 a swing motor
4 front working device
4 a boom
4*b* arm
4*c* bucket
4*d* boom cylinder

4*e* arm cylinder
4*f* bucket cylinder
5 swing frame
6 counterweight
7 cab
7 a swing lever
7*b* boom lever
7*c* arm lever
7*d* bucket lever
8 crawler
10 engine (prime mover)
12 hydraulic oil tank
13 main pump
14 pilot pump
15, 16, 17, 18 directional control valve
18*a*, 18*b* pilot port
19 pilot primary valve
20*a*, 20*b*, 21*a*, 21*b*, 22*a*, 22*b*, 23*a*, 23*b* pilot control valve
24*a*, 24*b*, 25*a*, 25*b*, 26*a*, 26*b*, 27*a*, 27*b* pressure sensor
28 main relief valve
29 pilot relief valve
30*a*, 30*b* swing relief valve
50 controller
51 CPU
52 memory

The invention claimed is:

1. A work machine comprising:

a prime mover;

a hydraulic pump configured to pump a hydraulic oil upon being driven by the prime mover;

a hydraulic actuator configured to operate upon being supplied with or discharging the hydraulic oil;

a supply flow path for supplying the hydraulic oil pumped by the hydraulic pump to the hydraulic actuator;

a return flow path for bringing the hydraulic oil discharged from the hydraulic actuator to a hydraulic oil tank;

a directional control valve having a spool that moves between a supply and discharge position and a blocking position, the supply and discharge position being a position for opening the supply flow path and the return flow path to cause the hydraulic oil to be supplied to and discharged from the hydraulic actuator, and the blocking position being a position for blocking the supply flow path and the return flow path to stop the hydraulic oil to be supplied to and discharged from the hydraulic actuator;

an operation device configured to be operated between an operation position corresponding to the supply and discharge position of the spool and a neutral position corresponding to the blocking position of the spool; and a controller configured to bring the spool closer to the supply and discharge position as the operation device approaches the operation position to increase a volume of the hydraulic oil to be supplied to and discharged from the hydraulic actuator, and bring the spool closer to the blocking position as the operation device approaches the neutral position to reduce the volume of the hydraulic oil to be supplied to and discharged from the hydraulic actuator, wherein in a case where the operation device has been operated from the operation position toward the neutral position, the controller is configured to:

move the spool from the supply and discharge position toward the blocking position at a first speed that is slower than a reference speed in a case where an operation speed of the operation device is less than a quick operation threshold; and move the spool from the supply and discharge position toward the blocking position at a second speed that is faster than the first speed in a case where the operation speed is equal to or more than the quick operation threshold.

2. The work machine according to claim 1, wherein the second speed is a speed that is slower than the reference speed.

3. The work machine according to claim 2, wherein the controller is configured to:

move the spool at the first speed in a case where the operation speed is equal to or more than the quick operation threshold and the operation device is located at a position that is less than an initial operation threshold set based on a current position and a target position of the operation device; and move the spool at the second speed in a case where the operation speed is equal to or more than the quick operation threshold and the operation device is located at a position that is equal to or more than the initial operation threshold.

4. The work machine according to claim 2, wherein the controller is configured to cancel control of decelerating the spool in a case where the operation device has been stopped between the operation position and the neutral position.

* * * * *